US011985577B2

(12) United States Patent
Ucar et al.

(10) Patent No.: US 11,985,577 B2
(45) Date of Patent: May 14, 2024

(54) UNINTERRUPTED VEHICULAR CLOUD SERVICE IN AN OVERLAPPING VEHICULAR MICRO CLOUD AREA

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

( * ) Notice: Subject to any disclaimer, the term of this patent is extended or adjusted under 35 U.S.C. 154(b) by 226 days.

(21) Appl. No.: 17/500,742

(22) Filed: Oct. 13, 2021

(65) Prior Publication Data

US 2023/0110310 A1    Apr. 13, 2023

(51) Int. Cl.
| | | |
|---|---|---|
| *H04W 4/44* | (2018.01) | |
| *H04L 67/12* | (2022.01) | |
| *H04W 4/02* | (2018.01) | |
| *H04W 4/029* | (2018.01) | |
| *H04W 4/50* | (2018.01) | |

(52) U.S. Cl.
CPC ............... *H04W 4/44* (2018.02); *H04L 67/12* (2013.01); *H04W 4/023* (2013.01); *H04W 4/029* (2018.02); *H04W 4/50* (2018.02)

(58) Field of Classification Search
CPC ....... H04W 84/18; H04W 4/029; H04W 4/50; H04W 4/023; H04L 67/12; H04L 67/10; H04L 67/1097; H04L 67/52; G06F 9/5072; G07C 5/0808; G08G 1/0112; G08G 1/0133; G08G 1/0141
See application file for complete search history.

(56) References Cited

U.S. PATENT DOCUMENTS

| | | |
|---|---|---|
| 8,457,143 B2 | 6/2013 | Oh et al. |
| 9,949,174 B2 | 4/2018 | Olsson et al. |
| 10,554,759 B2 | 2/2020 | Penilla et al. |
| 10,567,923 B2 | 2/2020 | Gade et al. |
| 10,587,998 B2 | 3/2020 | Altintas et al. |

(Continued)

OTHER PUBLICATIONS

Higuchi How to Keep a Vehicular Micro Cloud Intact 2018 IEEE.pdf (Year: 2018).*

(Continued)

*Primary Examiner* — Ernest G Tacsik
(74) *Attorney, Agent, or Firm* — Burbage Law, P.C.; Jon-Michael Burbage

(57) ABSTRACT

The disclosure includes embodiments for provision of an uninterrupted vehicular cloud service. A method according to some embodiments includes determining that an ego vehicle is approaching an overlapping vehicular micro cloud area where a plurality of vehicular micro clouds are active. The method includes retrieving intrinsic data describing driving behavior of members of the plurality of vehicular micro clouds. The method includes retrieving extrinsic data describing a roadway geometry of the overlapping vehicular micro cloud area. The method includes determining, based on one or more of the intrinsic data and the extrinsic data, a strategy for ensuring that the plurality of vehicular micro clouds provide an uninterrupted vehicular cloud service. The method includes taking steps to execute the strategy so that the uninterrupted vehicular cloud service is provided.

20 Claims, 7 Drawing Sheets

(56) References Cited

U.S. PATENT DOCUMENTS

| | | |
|---|---|---|
| 2005/0026619 A1 | 2/2005 | Jha |
| 2016/0295589 A1 | 10/2016 | Nikopour et al. |
| 2017/0034778 A1* | 2/2017 | Brunsman .............. H04W 24/02 |
| 2018/0122234 A1* | 5/2018 | Nascimento .......... G08G 1/0116 |
| 2020/0287960 A1 | 9/2020 | Higuchi et al. |
| 2020/0313959 A1* | 10/2020 | Higuchi ................ H04W 48/18 |
| 2021/0007023 A1 | 1/2021 | Umapathy et al. |
| 2021/0204101 A1 | 7/2021 | Kim et al. |
| 2023/0113812 A1* | 4/2023 | White .............. G08G 1/096741 |
| | | 340/436 |

OTHER PUBLICATIONS

Ucar, Seyhan et al., "Multihop-Cluster Based IEEE 802.11p and LTE Hybrid Architecture for VANET Safety Message Dissemination," IEEE Transactions on Vehicular Technology 65.4, Apr. 2016, 16 pages.

Luoto, Petri et al., "Vehicle clustering for improving enhanced LTE-V2X network performance," European Conference on Networks and Communications (EuCNC), 2017, 5 pages.

* cited by examiner

UNINTERRUPTED VEHICULAR CLOUD SERVICE IN AN OVERLAPPING VEHICULAR MICRO CLOUD AREA

BACKGROUND

The specification relates providing uninterrupted vehicular cloud service in an overlapping vehicular micro cloud area.

Modern vehicles broadcast vehicle-to-everything (V2X) messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." Other types of vehicle control systems are possible. A vehicle control system includes code and routines, and optionally hardware, which are operable to control the operation of some or all of the systems of a vehicle.

A particular vehicle that includes one of these vehicle control systems is referred to herein as an "ego vehicle" and other vehicles in the vicinity of the ego vehicle are referred to as "remote vehicles."

SUMMARY

Described herein are embodiments of a strategy system. See, for example, the strategy system illustrated in FIGS. 1 and 2.

Connected vehicles include vehicles that have a communication unit that is operable to send and receive wireless messages via a network such as the network 105 depicted in FIG. 1. Connected vehicles are referred to herein as "vehicles" or "connected vehicles."

Vehicles form vehicular micro clouds to assist them in completing vehicular cloud services that they would not otherwise be able to complete individually due, for example, to the limitations of their onboard computer hardware, software, bandwidth, and/or network access. A vehicle that is a member of a vehicular micro cloud is referred to as a "member." A vehicular micro cloud includes a plurality of members. A vehicular cloud service is provided by the members of the vehicular micro cloud completing vehicular micro cloud tasks (herein, "tasks" or "vehicular micro cloud tasks") that are assigned to them by a "hub vehicle" that is a member of the vehicular micro cloud and also the leader of the vehicular micro cloud. The completion of the vehicular cloud service benefits one or more of the members of the vehicular micro cloud. Providing vehicular cloud services is a primary purpose that vehicles form and maintain vehicular micro clouds.

A problem is that members enter areas or situations where there are multiple vehicle micro clouds. Such an area is referred to as an "overlapping vehicular micro cloud area." The members may begin to leave the vehicular micro cloud and/or join other vehicular micro clouds. This is problematic for two example reasons. First, if a member leaves a first vehicular micro cloud, they are not available to complete the tasks they have been assigned. Second, if a member stays in a first vehicular micro cloud but also joins a second vehicular micro cloud, then the second vehicular micro cloud assigns the member tasks in addition the tasks that are assigned to the member by the first vehicular micro cloud; this is problematic since the onboard vehicle computer of the member may not have time to complete the tasks of both vehicle micro clouds or be unsure how to prioritize the completion of these different tasks assigned to it by the two vehicle micro clouds. Either way, this causes the functionality of the vehicular micro cloud to break down since the tasks are not completed on time or not completed at all, and so, the vehicle cloud service is not provided or is provided too late. When this happens, the provision of vehicle cloud services is said to be "interrupted."

Some roadway characteristics or roadway geometry are more likely to be an overlapping vehicular micro cloud area than others. For example, the following types of roadway geometry are more likely to be an overlapping vehicular micro cloud area: an intersection; a roundabout; a traffic light; and a toll gate of a toll road. An example of an overlapping vehicular micro cloud area is depicted in FIGS. 6A and 6B in which an intersection is depicted.

Described herein are embodiments of a strategy system that solves the problem described above by determining and implementing strategies for the completion of tasks to ensure that a vehicle micro cloud is able to provide an uninterrupted vehicle cloud service to one or more of its members.

The strategy system includes code and routines that are stored on a non-transitory memory. In some embodiments, the code and routines of the strategy system are configured, when executed by a processor (e.g., a processor of an onboard vehicle computer of an ego vehicle), to cause the processor to execute one or more of the steps depicted in methods 300, 400, 500 of FIG. 3, FIGS. 4A and 4B, and FIG. 5, respectively.

Examples of the embodiments are now described. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method executed by an onboard vehicle computer of an ego vehicle. The method also includes determining that the ego vehicle is approaching an overlapping vehicular micro cloud area where a plurality of vehicular micro clouds are active; retrieving intrinsic data describing driving behavior of members of the plurality of vehicular micro clouds; retrieving extrinsic data describing a roadway geometry of the overlapping vehicular micro cloud area; determining, based on one or more of the intrinsic data and the extrinsic data, a strategy for ensuring that the plurality of vehicular micro clouds provide an uninterrupted vehicular cloud service; and taking steps to execute the strategy so that the uninterrupted vehicular cloud service is provided. Other embodiments of this aspect include corresponding computer systems, apparatus, and computer programs recorded on one or more computer storage devices, each configured to perform the actions of the methods.

Implementations may include one or more of the following features. The method where the ego vehicle is a hub vehicle of a vehicular micro cloud included in the plurality. The ego vehicle is not a hub vehicle of a vehicular micro cloud included in the plurality. The overlapping vehicular micro cloud area includes at least one geometry selected from a group including: an intersection; a roundabout; a traffic light; and a toll gate. The strategy is proactive, and the steps of the strategy are implemented before reaching the overlapping vehicular micro cloud area. The strategy is reactive, and the steps of the strategy are implemented after reaching the overlapping vehicular micro cloud area. The uninterrupted vehicular cloud service includes at least one vehicular cloud service that is continuously provided before reaching the overlapping vehicular micro cloud area and after reaching the overlapping vehicular micro cloud area. Implementations of the described techniques may include hardware, a method or process, or computer software on a computer-accessible medium.

One general aspect includes a system of an ego vehicle. The system also includes a non-transitory memory; and a processor communicatively coupled to the non-transitory memory, where the non-transitory memory stores computer readable code that is operable, when executed by the processor, to cause the processor to execute steps including: determining that the ego vehicle is approaching an overlapping vehicular micro cloud area where a plurality of vehicular micro clouds are active; retrieving intrinsic data describing driving behavior of members of the plurality of vehicular micro clouds; retrieving extrinsic data describing a roadway geometry of the overlapping vehicular micro cloud area; determining, based on one or more of the intrinsic data and the extrinsic data, a strategy for ensuring that the plurality of vehicular micro clouds provide an uninterrupted vehicular cloud service; and taking steps to execute the strategy so that the uninterrupted vehicular cloud service is provided. Other embodiments of this aspect include corresponding computer systems, apparatus, and computer programs recorded on one or more computer storage devices, each configured to perform the actions of the methods.

Implementations may include one or more of the following features. The system where the ego vehicle is a hub vehicle of a vehicular micro cloud included in the plurality. The ego vehicle is not a hub vehicle of a vehicular micro cloud included in the plurality. The overlapping vehicular micro cloud area includes at least one geometry selected from a group including: an intersection; a roundabout; a traffic light; and a toll gate. The strategy is proactive, and the steps of the strategy are implemented before reaching the overlapping vehicular micro cloud area. The strategy is reactive, and the steps of the strategy are implemented after reaching the overlapping vehicular micro cloud area. The uninterrupted vehicular cloud service includes at least one vehicular cloud service that is continuously provided before reaching the overlapping vehicular micro cloud area and after reaching the overlapping vehicular micro cloud area. Implementations of the described techniques may include hardware, a method or process, or computer software on a computer-accessible medium.

One general aspect includes a computer program product including computer code stored on a non-transitory memory that is operable, when executed by an onboard vehicle computer, to execute the computer code and cause the onboard vehicle computer to execute steps including: determining that the ego vehicle is approaching an overlapping vehicular micro cloud area where a plurality of vehicular micro clouds are active; retrieving intrinsic data describing driving behavior of members of the plurality of vehicular micro clouds; retrieving extrinsic data describing a roadway geometry of the overlapping vehicular micro cloud area; determining, based on one or more of the intrinsic data and the extrinsic data, a strategy for ensuring that the plurality of vehicular micro clouds provide an uninterrupted vehicular cloud service; and taking steps to execute the strategy so that the uninterrupted vehicular cloud service is provided. Other embodiments of this aspect include corresponding computer systems, apparatus, and computer programs recorded on one or more computer storage devices, each configured to perform the actions of the methods.

Implementations may include one or more of the following features. The computer program product where the ego vehicle is a hub vehicle of a vehicular micro cloud included in the plurality. The ego vehicle is not a hub vehicle of a vehicular micro cloud included in the plurality. The overlapping vehicular micro cloud area includes at least one geometry selected from a group including: an intersection; a roundabout; a traffic light; and a toll gate. The strategy is proactive, and the steps of the strategy are implemented before reaching the overlapping vehicular micro cloud area. The strategy is reactive, and the steps of the strategy are implemented after reaching the overlapping vehicular micro cloud area. The uninterrupted vehicular cloud service includes at least one vehicular cloud service that is continuously provided before reaching the overlapping vehicular micro cloud area and after reaching the overlapping vehicular micro cloud area. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Described herein are embodiments of a strategy system. The functionality of the strategy system is now introduced according to some embodiments.

Vehicles include onboard sensors that constantly record sensor data describing their external environment. In some embodiments, the sensor data is time stamped so that individual sensor measurements recorded by the onboard sensors include a time stamp describing the time when the sensor measurement was recorded. Time data includes digital data that describes the time stamps for the sensor measurements that are described by the sensor data. Vehicles transmit V2X messages to one another. Examples of the time data according to some embodiments include the time data 154, 155 depicted in FIG. 1.

The sensor data includes digital data describing the sensor measurements recorded by the onboard sensors (e.g., the sensor set). In some embodiments, instances of sensor data describe one or more sensor measurements, and the instances of sensor data are timestamped with time data to indicate the time when the one or more sensor measurements were recorded.

Remote sensor data includes digital data that describes the sensor measurements recorded by the sensor set of a remote vehicle. An example of the remote sensor data in some embodiments includes the remote sensor data 193 depicted in FIG. 1. In some embodiments, the sensor measurements described by the remote sensor data 193 are time stamped. Time data 154 includes digital data that describes the time stamps for the sensor measurements described by the remote sensor data 193.

Ego sensor data includes digital data that describes the sensor measurements recorded by the sensor set of an ego vehicle. An example of the ego sensor data in some embodiments includes the ego sensor data 195 depicted in FIG. 1. In some embodiments, the sensor measurements described by the ego sensor data 195 are time stamped. Time data 155 includes digital data that describes the time stamps for the sensor measurements described by the ego sensor data 195.

V2X messages include V2X data in their payload. The V2X data includes, among other things, the sensor data that vehicles record using their sensor sets. Vehicles that receive these V2X messages use this V2X data to improve their awareness of their environment. For vehicles that include Advanced Driver Assistance Systems (ADAS systems) or autonomous driving systems, the V2X data is inputted to these systems so that they can better understand their driving environment when providing their functionality.

An example of one specific type of sensor data includes GPS data. "GPS" refers to "geographic positioning system." The GPS data includes digital data that describes the geographic location of an object such as a vehicle or a smartphone.

Figure 1:
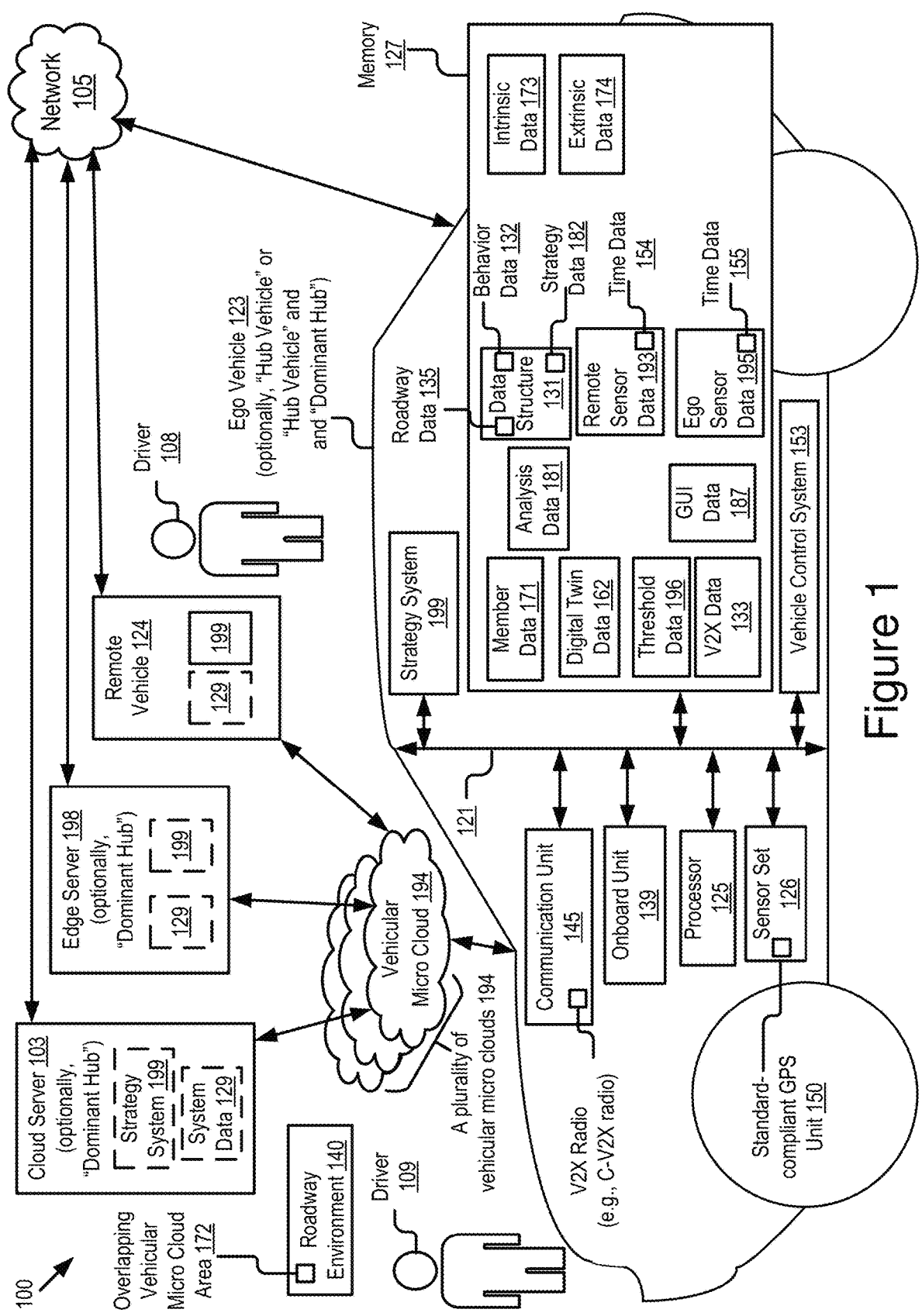
FIG. 1 is a block diagram illustrating an operating environment for a strategy system according to some embodiments.

An example of the V2X data according to some embodiments includes the V2X data 133 depicted in FIG. 1. For example, with reference to FIG. 1, the remote sensor data is received by the communication unit of the ego vehicle via a V2X transmission that includes V2X data including the remote sensor data as its payload; the strategy system of the ego vehicle then parses the remote sensor data from the V2X data and stores the V2X data and the remote sensor data in the memory 127 of the ego vehicle 123. In some embodiments, the V2X data includes the member data for the vehicular micro cloud. In this way, members of a vehicular micro cloud share sensor data and member data with one another. The member data describes, among other things, which tasks are assigned to which member of the vehicular micro cloud. The member data is described in more detail below.

Vehicular Micro Clouds

The embodiments described herein include a plurality of vehicular micro clouds. For example, the ego vehicle and the remote vehicle are connected vehicles (e.g., vehicles that include a processor, a communication unit, and an instance of the strategy system) and members of one or more of a plurality of vehicular micro clouds. In some embodiments, the vehicular micro cloud hosts the strategy system in a distributed fashion using the computing resources of the vehicles that are members of the vehicular micro cloud so that a cloud server and/or an edge server is not strictly necessary to provide the service of the strategy system to the users of the strategy system.

In some embodiments, a server such as a cloud server and/or an edge server is also an element of the vehicle micro cloud. A cloud server includes a conventional hardware server having network communication capabilities such as a computer, a laptop, a microcomputer, etc. An example of a cloud server according to some embodiments includes a cloud server 103 as depicted in FIG. 1. An edge server includes a conventional hardware server having network communication capabilities such as a computer, a laptop, a microcomputer, etc. An example of an edge server according to some embodiments includes an edge server 198 as depicted in FIG. 1.

In some embodiments, a vehicular micro cloud includes a group of connected vehicles where vehicles perform task(s) cooperatively/collaboratively. Vehicular micro clouds can be divided into two categories based on their mobility: (1) stationary; and (2) mobile. An example of a vehicular micro cloud according to some embodiments includes a vehicular micro cloud 194 depicted in FIG. 1. As depicted in FIG. 1, an operating environment 100 for the strategy system 199 includes a plurality of vehicular micro clouds 194. For example, the operating environment includes an overlapping vehicular micro cloud area 172 having a plurality of vehicular micro clouds active therein.

In the stationary cloud, a certain geographical region is designated as the vehicular micro cloud region, and vehicles entering that region contribute their resources for vehicular cloud services. A stationary vehicular micro cloud is sometimes referred to as a "static" vehicular micro cloud.

In the mobile vehicular cloud, on the other hand, the vehicular micro cloud moves as the micro cloud members move. A mobile vehicular micro cloud is sometimes referred to as a "dynamic" vehicular micro cloud.

In some embodiments, as an optional operating environment, the strategy system is hosted by a plurality of members of a vehicular micro cloud. In some embodiments, these members are also registered with the strategy system. For example, for each member the strategy system has access to digital data that includes a unique identifier of the member. In some embodiments, each instance of digital data shared among the members of the vehicular micro cloud include one or more bits of data that include this unique identifier so that attribution of the digital data is provided; this attribution is beneficial to monitor and improve the functionality of the strategy system as well as identify malicious users.

In some embodiments, the strategy system causes the vehicles, which each include an instance of the strategy system or at least a subset of the code and routines of the strategy system, to execute steps to form the vehicular micro cloud.

Member data includes digital data that describes information about a vehicular micro cloud and its members. For example, the member data is digital data that describes the identity of the members of the vehicular micro cloud and their specific computing resources; all members of the vehicular micro cloud make their computing resources available to one another for their collective benefit. An example of the member data according to some embodiments includes the member data 171 depicted in FIG. 1.

In some embodiments, the strategy system 199 cause the communication unit to transmit a wireless message to candidates for membership in the vehicular micro cloud that causes these candidates to join the vehicular micro cloud. The list of candidates is determined by the strategy system based on the technical data which is transmitted by the candidates to one another via BSMs; in some embodiments, these BSMs also include sensor data recorded by the vehicles that transmit the BSMs.

In some embodiments, the strategy system 199 for a hub of a specific vehicular micro cloud determines candidates to join the vehicular micro cloud managed by the hub as new vehicles come within V2X communication range of the hub (e.g., within 1,500 feet or some other transmission range included with V2X communication).

In some embodiments, when a new vehicle joins the vehicular micro cloud managed by the hub, the hub generates new member data for the vehicular micro cloud including, among other things, digital data describing the schedule of tasks which includes those tasks assigned to the new member. The hub then transmits V2X messages to the members of the vehicular micro cloud that includes V2X data that distributes the new member data to the members of the vehicular micro cloud, including the new member. The strategy system for the new member is now responsible for executing the tasks assigned to it by the hub as described in the member data.

As briefly introduced above, vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task. An example of a task includes, for example, executing a computing process that is an element of delivering a vehicular cloud service to one or more members of the vehicular micro cloud.

In some embodiments, the member data describes, for each member of a particular vehicular micro cloud, the tasks assigned to each member. The member data also describes a schedule of tasks for the vehicular micro cloud. A schedule of tasks described by the member data 171 includes, for one or more vehicular micro clouds, digital data that describes one or more of the following: (1) what tasks are assigned; (2) for each assigned task, which member it is assigned to; and (3) for each assigned task, time(s) when the task is to be started and/or completed. In some embodiments, the members of a vehicular micro cloud exchange V2X messages and the V2X data includes, among other types of digital data, the member data.

In some embodiments, the vehicular micro cloud assigned by the hub of a micro cloud includes some or all of the tasks which are necessary to provide one or more vehicular cloud services. In some embodiments, the strategy system is operable to receive member data for a plurality of vehicular micro clouds and organize a schedule of tasks for the members of the plurality of vehicular micro clouds that is operable to ensure that the plurality of vehicular cloud services provided by the plurality of vehicular micro clouds is uninterrupted even as members are entering and leaving different vehicular micro clouds within a overlapping vehicular micro cloud area.

In some embodiments, a vehicular micro cloud includes a group of connected vehicles that communicate with one another via V2X messages to provide, among other things such as a vehicular cloud service, the service of the strategy system to the ego vehicle and/or the members of the vehicular micro cloud.

The vehicular micro cloud includes multiple members. A member of the vehicular micro cloud includes a connected vehicle that sends and receives V2X messages via a network (e.g., the network 105 depicted in FIG. 1). In some embodiments, the network is a serverless ad-hock vehicular network. In some embodiments, the members of the network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network. In some embodiments, the edge server 198 depicted in FIG. 1 is an element of a hardware infrastructure device.

In some embodiments, the serverless ad-hoc vehicular network includes a set of sensor rich vehicles. A sensor rich vehicle is a connected vehicle that includes a rich sensor set. In some embodiments, one or more of the ego vehicle and the remote vehicle depicted in FIG. 1 are examples of a sensor rich vehicle. Although only one remote vehicle is depicted in FIG. 1, in practice the operating environment may include one or more remote vehicles.

In some embodiments, an operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but is able to provide shared rides to users because the driver of the legacy vehicle has a smart device (e.g., an electronic processor-based computing device such as a smartphone, smartwatch, tablet computer, laptop, smart glasses, etc.) which they use to receive information that enables them to participate as registered vehicles that provide shared rides to the users of the Service provided by the strategy system.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure that is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "group of connected vehicles" since a vehicular micro cloud is an example of a group of connected vehicles in some embodiments.

Distributed data storage and computing by a group of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., some or all of the system data 129 described herein), shared computational power, shared bandwidth, shared memory, and cloudification services.

Example Vehicular Micro Cloud Tasks

Examples of vehicular micro cloud tasks (herein, "tasks") are now described according to some embodiments. Vehicular micro clouds are motivated by the emerging concept of "vehicle cloudification." Vehicle cloudification means that vehicles equipped with on-board computer unit(s) and wireless communication functionalities form a cluster, called a vehicular micro cloud, and collaborate with other members of the vehicular micro cloud over V2V networks or V2X networks to perform computation, data storage, and data communication tasks in an efficient way. These types of tasks are referred to herein as "vehicular micro cloud tasks" or "tasks" if plural, or a "vehicular micro cloud task" or "task" if singular.

In some embodiments, a vehicular micro cloud task includes any computational, data storage, or data communication task collaboratively performed by a plurality of the members of a vehicular micro cloud. In some embodiments, the set of tasks described above with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to identify a problem (e.g., a collision whose likelihood satisfies a threshold of probability described by the threshold data), and the result includes digital data that describes the solution to the problem (e.g., a series of driving maneuvers that will avoid a collision or make the likelihood of collision no longer satisfy the threshold). In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task includes determining a series of driving maneuvers (a "driving plan") considering the combination of identified driving behaviors of various vehicles (e.g., an example of "intrinsic data") and other extrinsic variables such as weather conditions, lighting conditions, road-surface conditions (e.g., wet or icy conditions), roadway congestion (e.g., number of vehicles per unit of measurement such as feet or meters), and road geometry conditions.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks (e.g., determining the analysis data, executing the digital twin simulations, etc.) that they could not perform alone or store large data sets that they could not store alone. In some embodiments, the computational power of a solitary ego vehicle is sufficient to execute these tasks.

Vehicular micro clouds are described in the patent applications that are incorporated by reference in this paragraph. This patent application is related to the following patent applications, the entirety of each of which is incorporated herein by reference: U.S. patent application Ser. No. 16/943,443 filed on Jul. 30, 2020 and entitled "Vehicular Nano Cloud"; U.S. Pat. No. 10,924,337 issued on Feb. 16, 2021 and entitled "Vehicular Cloud Slicing"; U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

In some embodiments, the strategy system is operable to execute a set of tasks assigned by a vehicular micro cloud. For example, the strategy system is an element of a hub of a first vehicular micro cloud. There is a second vehicular micro cloud in the same geographic area as the first vehicular micro cloud thereby forming an overlapping vehicular micro cloud area. The strategy system receives a set of V2X messages (e.g., each including V2X data) for vehicles that are approaching the geographic area of the roadway region that is serviced by the first vehicular micro cloud and this triggers the strategy system to identify candidates to join the first vehicular micro cloud and transmit V2X messages to these candidates inviting them to join the first vehicular micro cloud. A remote vehicle joins the first vehicular micro cloud. The remote vehicle is also a member of the second vehicular micro cloud. The remote vehicle is already assigned tasks A, B, and C by the second vehicular micro cloud at the time that the remote vehicle joins the first vehicular micro cloud. Tasks A, B, and C benefit one or more members of the second vehicular micro cloud. The strategy system processes V2X data from the remote vehicle and identifies that tasks A, B, and C are assigned to the remote vehicle by the second vehicular micro cloud as well as the deadlines for completion of these tasks. The strategy system determines strategy data by selecting tasks X, Y, and Z to assign to the remote vehicle for the benefit of one or more members of the first vehicular micro cloud; the selection of tasks X, Y, and Z are configured to be completable by the remote vehicle by their deadline without preventing the remote vehicle from also completing tasks A, B, and C by their deadline. This is referred to as forming a schedule of tasks for a plurality of vehicle micro clouds. In this way, the operation of strategy system is beneficially configured to provide uninterrupted completion of the vehicle cloud services of both the first vehicular micro cloud and the second vehicular micro cloud. The strategy system determines member data that describes the scheduled of tasks. The strategy system broadcasts V2X messages that include the member data within its payload (e.g., within the V2X data). In this way the strategy system of the hub takes steps to provide uninterrupted completion of the vehicle cloud services of both the first vehicular micro cloud and the second vehicular micro cloud. The strategy system of the remote vehicle then executes all of its assigned tasks by their deadlines so that the uninterrupted provision of the vehicle cloud services of both the first vehicular micro cloud and the second vehicular micro cloud is accomplished. Hub vehicles are described in more detail below.

Figures 6A, 6B:
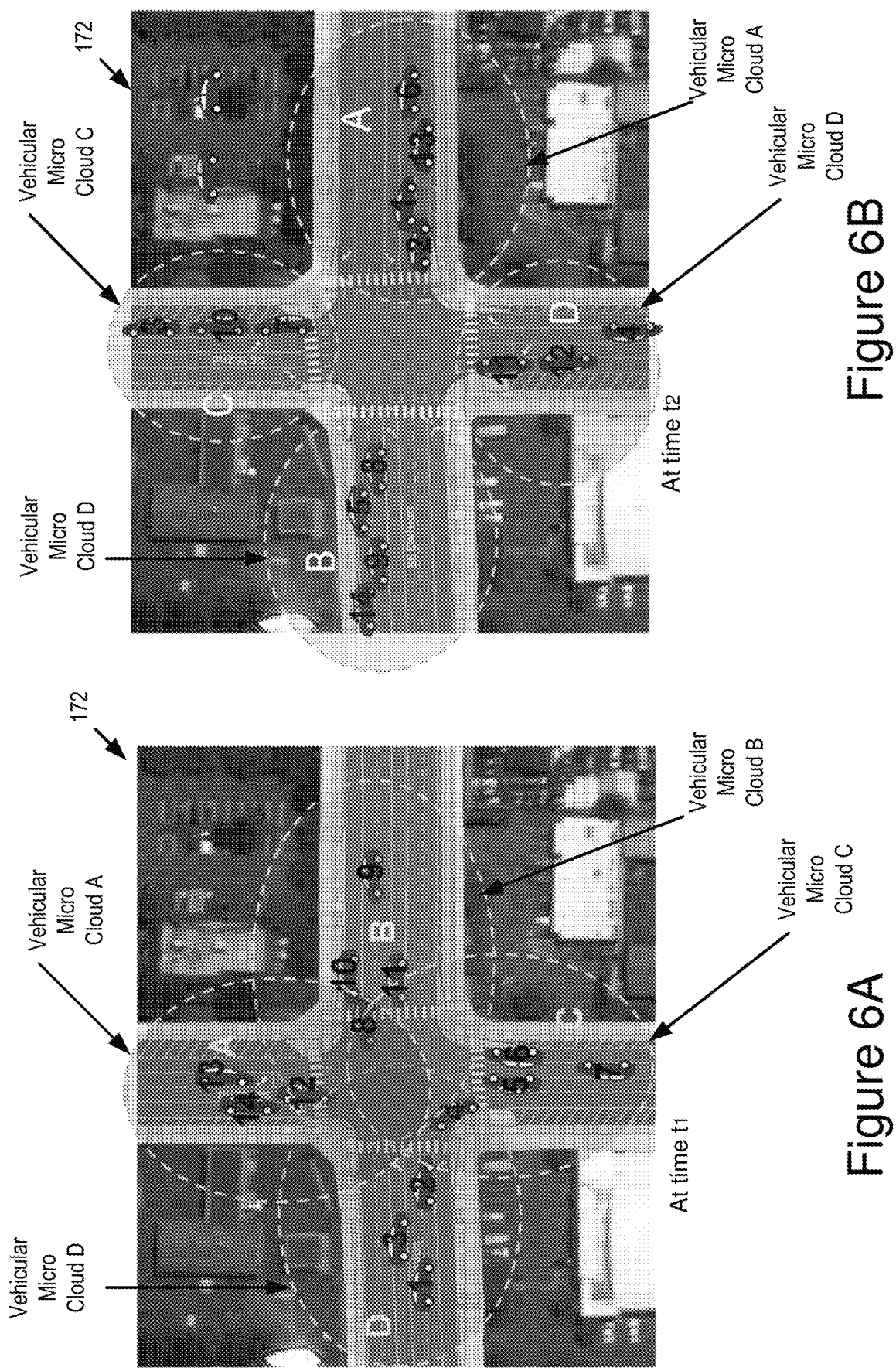
FIGS. 6A and 6B are block diagrams illustrating a strategy implemented by the strategy system to manage an overlapping vehicular micro cloud area according to some embodiments.

The above example is intended to be illustrative and not limiting. The principles described in this example can be applied to more complicated scenarios. In some embodiments, the scenarios managed by the strategy system include a plurality of vehicles and a plurality of vehicular micro clouds, with one or more of the plurality of vehicles entering and/or leaving various vehicular micro clouds. An example of such a scenario is depicted in FIGS. 6A and 6B. Regardless of the complexity of the example, the strategy system determines strategy data that describes a schedule of tasks for the plurality of members of the plurality of vehicle micro clouds that successfully achieves uninterrupted provision of vehicular micro clouds services which are provided by the plurality of vehicular micro clouds.

In some embodiments, the schedule of tasks incorporates task swaps among various members to generate a schedule of tasks that achieves uninterrupted provision of vehicular micro cloud services which are provided by the plurality of vehicular micro clouds. For example, the schedule of tasks outputted by strategy system requires one or more members to swap one or more tasks assignments with one another.

In some embodiments, the schedule of tasks assigns the completion of tasks to one or more nano clouds or vehicular micro cloud slices in order to generate a schedule of tasks that achieves uninterrupted provision of vehicular micro cloud services which are provided by the plurality of vehicular micro clouds. Nano clouds are described in more detail below, as well as in U.S. patent application Ser. No. 16/943,443 filed on Jul. 30, 2020 and entitled "Vehicular Nano Cloud," the entirety of which is incorporated herein by reference. Vehicular micro cloud slices are described in more detail in U.S. Pat. No. 10,924,337 issued on Feb. 16, 2021 and entitled "Vehicular Cloud Slicing," the entirety of which is incorporated herein by reference.

The endpoints that are part of the vehicular micro cloud may be referred to herein as "members," "micro cloud members," or "member vehicles." Examples of members include one or more of the following: a connected vehicle;

an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

Extrinsic Data

Extrinsic data includes digital data that describes a roadway geometry of a roadway environment. For example, the extrinsic data describes that the roadway geometry includes one or more of the following features: an intersection; a roundabout; a traffic light; and a toll gate. Such roadway geometries indicate the roadway environment is more likely to include an overlapping vehicular micro cloud area. An example of the extrinsic data according to some embodiments includes the extrinsic data 174 depicted in FIG. 1.

An example of a roadway environment according to some embodiments includes the roadway environment 140 depicted in FIG. 1. As depicted, the roadway environment includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

In some embodiments, the roadway environment includes an overlapping vehicular micro cloud area. An overlapping vehicular micro cloud area includes a portion of the roadway environment where a plurality of vehicular micro clouds are active. An example of an overlapping vehicular micro cloud area according to some embodiments includes the overlapping vehicular micro cloud area 172 depicted in FIG. 1.

In some embodiments, the strategy system determines the extrinsic data using sensor measurements of the roadway environment. For example, the strategy system determines the extrinsic data by analyzing the sensor data it has access to, e.g., one or more of the ego sensor data and the remote sensor data received from one or more remote vehicles. For example, the strategy system analyzes the ego sensor data and the remote sensor data to determine a roadway geometry of the roadway environment that the ego vehicle is approaching. In some embodiments, the strategy system determines the roadway geometry by comparing images and LIDAR measurements of the roadway environment against object priors of known roadway geometry features (e.g., an intersection, a roundabout, a traffic light, a toll gate, an on-ramp, an off-ramp, and any other type of roadway geometry feature).

In some embodiments, the ego vehicle includes a data structure stored on a memory. The data structure includes a data structure such as a database, table, or any other data structure. In some embodiments, the data structure stores one or more of the following types of digital data: roadway data; behavior data; and strategy data. An example of the data structure according to some embodiments includes the data structure 131 depicted in FIG. 1. An example of the roadway data according to some embodiments includes the roadway data 135 depicted in FIG. 1. An example of the behavior data according to some embodiments includes the behavior data 132 depicted in FIG. 1. An example of the strategy data according to some embodiments includes the strategy data 182 depicted in FIG. 1.

The roadway data includes digital data describing any information necessary for the strategy system to determine the extrinsic data. For example, the roadway data includes digital data that describes one or more object priors of one or more known roadway geometry features.

In some embodiments, the strategy system does not determine the extrinsic data using sensor data and instead determines the extrinsic data prior to the ego vehicle entering the roadway environment using the roadway data. For example, the strategy system determines the extrinsic data using satellite images of the roadway environment to identify portions of the roadway environment that are prone to becoming overlapping vehicular micro cloud areas. In these embodiments, the roadway data includes digital data that describes satellite images of the roadway environment including digital data in the satellite images created by the strategy system that indicate the one or more portions of the roadway environment that that are prone to becoming one or more overlapping vehicular micro cloud areas (e.g., because the satellite images indicate the presence of an intersection, a roundabout, a traffic light, a toll gate, an on-ramp, an off-ramp, and any other type of roadway geometry feature that is known to be prone to becoming an overlapping vehicular micro cloud area).

For example, at an earlier time than the time that the ego vehicle enters the overlapping vehicular micro cloud area, the strategy system analyzes the satellite images and modifies the roadway data to include the digital data that indicates the one or more portions of the roadway environment that are prone to becoming one or more overlapping vehicular micro cloud areas. In this way, the roadway data does not describe conventional satellite images, but instead describes satellite imagery that is improved to increase the functionality of the strategy system in identifying the presence of one or more overlapping vehicular micro cloud areas and generating the extrinsic data.

In some embodiments, the strategy system then executes at least one of the following methods to identify relevant extrinsic data while the ego vehicle is operating: (1) tracks the current geographic location of the ego vehicle in real time and determines the extrinsic data using the roadway data prior to the ego vehicle entering a portion of the roadway environment that includes an overlapping vehicular micro cloud area; and (2) generates plurality of instances of extrinsic data for all portions of the roadway environment at a design time, stores the extrinsic data in the data structure indexed based on geographic location, and, at a run time, tracks the geographic position of the ego vehicle in real time and retrieves from the data structure the instance of extrinsic data that corresponds to this geographic area so that the strategy system is able to identify portions of the roadway environment for this geographic position that are prone to becoming overlapping vehicular micro cloud areas.

Analysis data includes digital data that describes the output of any determination or analysis described herein. For example, the analysis data includes digital data that describes the one or more portions of the roadway environment that are prone to becoming one or more overlapping vehicular micro cloud areas. An example of the analysis data according to some embodiments includes the analysis data 181 depicted in FIG. 1.

The intrinsic data includes digital data that describes the driving behaviors and/or driving types of a plurality of the members of a plurality of vehicular micro clouds. In some embodiments, the intrinsic data describes the driving behaviors and/or driving types of a plurality of members of a plurality of vehicular micro clouds, including the driving behavior of the ego vehicle. An example of the intrinsic data according to some embodiments includes the intrinsic data 173 depicted in FIG. 1.

In some embodiments, members of the plurality of vehicular micro clouds determine their own intrinsic data describing their own behavior and transmit V2X messages to the other members of the plurality of vehicular micro clouds including intrinsic data notifying these members about their intrinsic behavior. This is an example of "self-reporting" intrinsic data. This is similar to how remote vehicles report their own remote sensor data to the other members of their vehicular micro cloud.

As used herein, the term "sensor data" refers to one or more of the ego sensor data, the remote sensor data, or a combination of the ego data and the remote sensor data.

In some embodiments, members do not self-report intrinsic data and the strategy system of the ego vehicle instead determines intrinsic data for the ego vehicle based on the sensor data that is available to the strategy system. Optionally, the strategy system of the ego vehicle determines the intrinsic data for a plurality of members of the plurality of vehicular micro clouds based on the available sensor data and the behavior data, as well as determining intrinsic data for the ego vehicle itself using this sensor data and behavior data.

In some embodiments, the behavior data includes digital data that describes information that is necessary for the strategy system to analyze sensor data and determine, based on this sensor data and the behavior data, what behavior and/or driving type is being exhibited by a particular vehicle such as the ego vehicle. For example, the behavior data includes one or more of the following types of digital data: digital data describing object priors of known vehicle behaviors and/or driving types; digital data describing patterns of known vehicle behaviors and/or driving types based on historical real-world data (e.g., based on data collected from the historical operation of the strategy system or real-world data sets available from universities, government agencies, standards creation bodies, etc.); digital data describing patterns of known vehicle behaviors and/or driving types based on one or more digital twin simulations; and any other known data set that is usable for the purpose of comparison against sensor data to determine the current driving behavior and/or driving types of one or more vehicles that are described by the sensor data. An example of the behavior data according to some embodiments includes the behavior data 132 depicted in FIG. 1.

In some embodiments, the strategy data includes digital data that describes a strategy for how to respond to an occurrence of an overlapping vehicular micro cloud area. For example, the strategy includes a plan for ensuring that the plurality of vehicular micro clouds provide an uninterrupted vehicular cloud service. For example, as members of a plurality of vehicular micro cloud approach an overlapping vehicular micro cloud area, they begin to modify their membership in the various vehicular micro clouds that are present in the overlapping vehicular micro cloud area. The strategy data describes a schedule of tasks that are operable to achieve an uninterrupted provision of vehicular cloud services for the plurality of vehicular micro clouds while members modify their membership in the plurality of vehicular micro clouds.

In some embodiments, the schedule of tasks describes, for each member of the vehicular micro clouds in the overlapping vehicular micro cloud area 17, which tasks they are assigned to execute. In some embodiments, the assigned set of tasks are assigned to the different members of the plurality of vehicle micro clouds by the hubs of these different vehicle micro clouds. The assigned set of tasks forms a schedule of tasks for a plurality of vehicles in a plurality of vehicular micro clouds. In some embodiments, the strategy system analyzes the schedule of tasks as well as which members are joining new or additional vehicle micro clouds (e.g., based on their requests to join different vehicle micro clouds or affirmative responses to join other vehicle micro clouds responsive to receiving requests to join) and determines which task swaps are necessary for each of the vehicular micro clouds to provide the vehicular cloud services they were previously providing before the occurrence of the overlapping vehicular micro cloud area without interruption (e.g., "uninterrupted vehicular cloud services").

In some embodiments, the strategy system is able to determine which members are joining new vehicle micro clouds because each member includes their own instance of the strategy system and the strategy system is configured to report member data to one or more of the following entities: the other hubs of the plurality of vehicular micro clouds, one of which is responsible for determining the strategy data for all of the plurality of vehicular micro clouds; and a server (e.g., the cloud server or the edge server) that is responsible for determining the strategy data for all of the plurality of vehicular micro clouds and distributing this strategy data to either each of the members of the plurality of vehicular micro clouds or the plurality of hubs of the vehicular micro clouds who then distribute the relevant portion of the strategy data to their respective members.

In some embodiments, the remote sensor data serves as a source of data, in addition to the ego sensor data and the behavior data stored in the data structure, for determining one or more of the intrinsic data and the extrinsic data.

The driver 108 is a human driver of the remote vehicle 124. The driver 109 is a human driver of the ego vehicle 123.

In some embodiments, the V2X data 133 is received by the ego vehicle 123 because the ego vehicle 123 and the remote vehicle 124 are members of the same vehicular micro cloud 194.

Threshold data includes digital data that describes any threshold described herein. An example of the threshold data includes the threshold data 196 depicted in FIG. 1.

A vehicle control system is an onboard system of a vehicle that controls the operation of a functionality of the vehicle. ADAS systems and autonomous driving systems are examples of vehicle control systems. Examples of the vehicle control system according to some embodiments includes the vehicle control system 153 depicted in FIG. 1.

Example General Method

In some embodiments, the strategy system includes code and routines that are operable, when executed by a processor, to cause the processor to execute one or more steps of an example general method described herein. The strategy system may be an element of one or more of the following: an ego vehicle; a remote connected vehicle; a cloud server; and an edge server installed in a roadway device such as a roadside unit (RSU). As described, the strategy system is an element of the ego vehicle, but this description is not intended to be limiting.

In some embodiments, these steps are executed by a processor or onboard vehicle computer of an ego vehicle. The ego vehicle is a connected vehicle. A connected vehicle is a vehicle that includes a communication unit. An example of a communication unit includes the communication unit 145 depicted in FIG. 1. The remote connected vehicle is also a connected vehicle, and so, it includes a communication unit.

As used herein, the term "wireless message" refers to a V2X message transmitted by a communication unit of a connected vehicle such as a remote connected vehicle or the ego vehicle.

The example general method is now described. In some embodiments, one or more steps of the example general method are skipped or modified. The steps of the example general method may be executed in any order, and not necessarily the order presented.

In some embodiments, a plurality of vehicles on a roadway include instances of the strategy system and the strategy systems of these vehicles also execute some or all of the steps described below. For example, one or more of these steps are executed by the members of a vehicular micro cloud in some embodiments. In some embodiments, a server such as a cloud server or an edge server includes an instance of the strategy system, and one or more steps are executed by the strategy system of one or more of these entities.

The steps of the example general method are now described according to some embodiments.

Step 1: The strategy system causes the sensor set of the ego vehicle to record ego sensor data. The ego sensor data includes digital data that describes the sensor measurements of the sensors that are included in the sensor set of the ego vehicle. In some embodiments, the individual sensor measurements are time stamped so an instance of ego sensor data describes both a sensor measurement and when this measurement was recorded. In some embodiments, the ego sensor data includes time data that describes the timestamps for the sensor measurements.

In some embodiments, the sensor measurements described by the ego sensor data describe one or more of the following: the ego vehicle over time including its location in a roadway environment over time; the location of the ego vehicle relative to other objects within the roadway environment over time; the driver's operation of the ego vehicle over time, the presence of other objects over time within the roadway environment that includes the ego vehicle; the location of these objects in the roadway over time relative to other objects (e.g., the location of these other objects relative to one another and relative to the ego vehicle); the behavior of these other objects over time; the geometry of the roadway over time; features in the roadway over time and changes in one or more of their position, velocity, and acceleration; kinematic information about the ego vehicle and/or any objects in the roadway environment; and any aspect of the roadway environment that is measurable by the sensors included in the sensor set of the ego vehicle.

An example of the ego sensor data according to some embodiments includes the ego sensor data 195 depicted in FIG. 1. An example of the time data associated with the ego sensor data 195 according to some embodiments includes the time data 155 depicted in FIG. 1.

The sensors included in the sensor set, and the type of measurements they can record, are described in more detail below.

Step 2: (Optional) A set of one or more remote vehicles in sensor range of the ego vehicle include their own instance of the strategy system. The strategy system of these remote vehicles causes the sensor sets of these remote vehicles to record sensor measurements of their roadway environment. These sensor measurements include sensor measurements similar to those described above for the ego sensor data.

The sensor measurements recorded by an individual remote connected vehicle from the set of remote vehicles is described by remote sensor data. The remote sensor data includes digital data that describes the sensor measurements of the sensors that are included in the sensor set of the remote connected vehicle. In some embodiments, the individual sensor measurements are time stamped so an instance of remote sensor data describes both a sensor measurement and when this measurement was recorded. In some embodiments, the remote sensor data includes time data that describes the timestamps for the sensor measurements.

In some embodiments, the sensor measurements described by the remote sensor data describe one or more of the following: the remote connected vehicle over time including its location in a roadway environment over time; the location of the remote connected vehicle relative to other objects within the roadway environment over time; a driver's operation of the remote connected vehicle over time, the presence of other objects (including the presence of the ego vehicle) over time within the roadway environment that includes the remote connected vehicle; the location of these objects (including the location of the ego vehicle) in the roadway over time relative to other objects (e.g., the location of the ego vehicle relative to the remote connected vehicle as measured from the perspective of the remote connected vehicle); the behavior of these other objects (including the behavior of the ego vehicle) over time; the geometry of the roadway over time; features in the roadway over time and changes in one or more of their position, velocity, and acceleration; kinematic information about the remote vehicle and/or any objects in the roadway environment; and any aspect of the roadway environment that is measurable by the sensors included in the sensor set of the remote vehicle An example of the remote sensor data according to some embodiments includes the remote sensor data 193 depicted in FIG. 1. An example of the time data associated with the remote sensor data 193 according to some embodiments includes the time data 154 depicted in FIG. 1.

The sensors included in the sensor sets of the remote vehicles are similar to those included in the ego vehicle.

Step 3: In some embodiments, the ego vehicle and the set of remote vehicles described in step 2 are members of a first vehicular micro cloud. In some embodiments, the first vehicular micro cloud is included in a plurality vehicular micro clouds such as that depicted in FIG. 1 or FIGS. 6A and 6B. In some embodiments, the ego vehicle and the remote vehicles are members of different vehicular micro clouds included in the plurality.

In some embodiments, one or more of the ego vehicle and one or more of the set of remote vehicles described at step 2 are members of a plurality of vehicular micro clouds.

Accordingly, the ego vehicle and the set of remote vehicles described in step 2 each have membership data describing, among other things, which vehicular micro cloud(s) they are members of, what their assigned tasks are for each of these vehicular micro clouds, and the deadline for starting and/or completing each of their assigned tasks.

The strategy systems of the ego vehicle and the set of remote vehicles described in step 2 retrieve their member data from their onboard memories.

Step 4: The strategy systems of the ego vehicle and the set of remote vehicles described in step 2 determine intrinsic data describing themselves using, for example, their own sensor data and their own locally stored behavior data. The strategy systems of the ego vehicle and the set of remote vehicles described in step 2 retrieve the intrinsic data they outputted at step 4 from their onboard non-transitory memories.

The intrinsic data describes one or more of the driving behavior and/or driving type of a particular vehicle. The driving behavior and/or driving type includes, for example, one or more of the following: a distracted driver; a conservative driver; a slow driver; a speeder; an aggressive driver; a timid driver; a vehicle operated by an autonomous driving system; a commercial driver; a vehicle approaching an on-ramp; a vehicle approaching an off-ramp; a vehicle about to turn; a vehicle about to park; etc.

In some embodiments, the driving behaviors and/or driving types described by the behavior data, and thus possibly indicated by the intrinsic data for a particular vehicle, include those described one or more of those described in the following publications: "National Mother Vehicle Crash Causation Survey Report to Congress," Publication No. DOT HS 811 059, Published in 2008 by the National Technical Information Service, Springfield, Va. 22161; "Analysis of SHRP2 Data to Understand Normal and Abnormal Driving Behavior in Work Zones," Publication No. FHWA-HRT-20-010, Published December 2019 by the U.S. Department of Transportation Federal Highway Administration, McLean, Va. 22101; Hankey et. al., "Description of the SHRP 2 Naturalistic Database and the Crash, Near-crash, and Baseline Data Sets Task Report," Published April 2016 by Virginia Tech Transportation Institute, Blacksburg, Va.; and the SHRP 2 Naturalistic Driving Study (NDS) database maintained by the Virginia Tech Transportation Institute, Blacksburg, Va. and retrieved from insight.shrp2nds.us on Aug. 24, 2021.

The intrinsic data is beneficial for determining a strategy (e.g., a schedule of tasks for the plurality of vehicular micro clouds within an overlapping vehicular micro cloud area) since the way a vehicle is driven affects their availability to execute different tasks by a specified start time and/or a specified end time. For example, a vehicle that is driving fast has less time to execute tasks than a vehicle that is driving slower relative to the vehicle driving fast.

Step 5: (Optional) The strategy systems of the ego vehicle and the set of remote vehicles described in step 2 determine extrinsic data describing the roadway environment they are heading into using, for example, one or more of their own sensor data and their own locally stored roadway data. The strategy systems of the ego vehicle and the set of remote vehicles described in step 2 retrieve the extrinsic data they outputted at step 5 from their onboard non-transitory memories.

Step 6: The strategy systems of the ego vehicle and the set of remote vehicles described in step 2 build V2X messages including V2X data. V2X data includes digital data that is the payload for a V2X message. An example of the V2X data according to some embodiments includes the V2X data 133 depicted in FIG. 1.

In some embodiments, the strategy systems of the ego vehicle and the set of remote vehicles described in step 2 build V2X data including, among other things, one or more of the following types of digital data: their sensor data generated at steps 1 or 2 (e.g., their ego sensor data 195 and time data 155 or their remote sensor data 193 and time data 154); their member data retrieved at step 3; their intrinsic data determined at step 4; and their extrinsic data determined at step 5. These strategy systems build V2X messages including the V2X data 133 as their payloads and cause the communication units of the ego vehicle and the set of remote vehicles described in step 2 to transmit (e.g., broadcast) V2X messages including the V2X data 133.

In some embodiments, each instance of V2X data for the ego vehicle includes a plurality of instances of ego sensor data and corresponding time data for the sensor measurements described by this ego sensor data. The strategy system of the ego vehicle builds its own V2X message including its own V2X data. The strategy system of the ego vehicle causes the communication unit of the ego vehicle to broadcast its own V2X message.

In some embodiments, each instance of V2X data for each remote vehicle includes a plurality of instances of remote sensor data and corresponding time data for the sensor measurements described by this remote sensor data. Each of the remote vehicles builds its own V2X message including its own V2X data. Each strategy system of each remote vehicle causes the communication unit of each of the remote vehicles to broadcast its own V2X message.

In some embodiments, an instance of V2X data includes extrinsic data generated by the strategy system that transmitted the V2X message including the V2X data. This extrinsic data is beneficial to other strategy systems whose communication units receive the V2X message. For example, this extrinsic data is beneficial for providing feedback to the strategy systems of other vehicles in case for one or more of the following purposes: to provide extrinsic data to strategy systems that were not able to generate their own extrinsic data; to provide additional data for strategy systems to improve the quality of their own extrinsic data (e.g., a mean or average of multiple instances of extrinsic data may be more accurate that a vehicle's sole instance of self-generated extrinsic data); to provide a quality check for strategy systems to compare their own extrinsic data to one or more instances of extrinsic data generated by other vehicles.

In some embodiments, an instance of V2X data includes intrinsic data generated by the strategy system that transmitted the V2X message including the V2X data. This intrinsic data is beneficial to other strategy systems whose communication units receive the V2X message. For example, this intrinsic data is beneficial for providing feedback to the strategy systems of other vehicles in case for one or more of the following purposes: to provide intrinsic data to strategy systems so that they do not have to generate intrinsic data for every vehicle in the roadway environment using their own self-generated sensor data; to provide additional data for strategy systems to improve the quality of the intrinsic data they have generated for the vehicle described by the intrinsic data (e.g., a mean or average of multiple instances of intrinsic data may be more accurate that a vehicle's sole instance of self-generated intrinsic data); to provide a quality check for strategy systems to compare the intrinsic data they generate to one or more instances of intrinsic data generated self-reported other vehicles.

Step 7: The strategy systems of the ego vehicle and the set of remote vehicles described in step 2 transmit (e.g., broadcast) the V2X messages built at step 6.

The following steps are described from the perspective of the ego vehicle for the purpose of clarity and understanding. However, these steps are also executable by the strategy systems of one or more other entities. For example, some or all these steps are executable by a strategy system that is an element of a server (e.g., a cloud server or an edge server).

As described in these subsequent steps, the strategy system of the subsequent steps, whether it be an element of the ego vehicle as described or an element of a server or remote vehicle, is an element of an entity that is determined to be responsible for determining the strategy (e.g., the schedule of tasks) for ensuring the provision of uninterrupted vehicular cloud services for a plurality of vehicular micro clouds.

Dominant Hub

For example, the member data distributed by the members includes, among other things, technical data. The technical data describes, among other things, the technological capabilities of each vehicle included in a particular vehicular micro cloud. Since this example general method is executed in on overlapping vehicular micro cloud area, the ego vehicle receives member data for a plurality of vehicular micro clouds, and this member data includes technical data for the different members of the plurality of vehicular micro clouds. Based on the technical data, the strategy system of the ego vehicle determines that the ego vehicle is the most technologically capable hub of the various hubs included in the plurality of vehicular micro clouds. The strategy systems of the other hubs have access to the same member data and will arrive at the same conclusion, or alternatively the ego vehicle transmits a V2X message including digital data announcing to the other hubs that the ego vehicle is the "hub or hubs" or the "dominant hub" from among the various hubs of the plurality of vehicular micro clouds. In this way, the ego vehicle is assigned responsibility for determining the strategy (e.g., the schedule of tasks) for ensuring the provision of uninterrupted vehicular cloud services for a plurality of vehicular micro clouds. Accordingly, in embodiments where the subsequent steps are executed by the ego vehicle, this is an example of how the ego vehicle is designated the dominant hub.

Alternatively, in some embodiments the responsibility for determining the strategy for ensuring the provision of uninterrupted vehicular cloud services for a plurality of vehicular micro clouds is configured to always reside with the strategy system of a cloud server or the strategy system for an edge server. For example, a geographic area of the roadway environment that includes the overlapping vehicular micro cloud area includes a RSU having an edge server that is responsible for determining the strategy for ensuring the provision of uninterrupted vehicular cloud services for the plurality of vehicular micro clouds within the geographic area. In these embodiments, the subsequent steps are modified to allow for V2X transmissions necessary for the strategy system of the edge server to provide its functionality.

In some embodiments, vehicles are not allowed to choose their own membership in any particular vehicular micro cloud. Instead, the strategy system of dominant hub of the vehicular micro cloud determines which vehicles will be members of which vehicular micro clouds based on which arrangements is beneficial to the implementation of the schedule of tasks which is ultimately generated by the strategy system of the dominant hub.

Hubs and example processes for selecting hubs are described in more detail below. In some embodiments, the principles described herein for selecting a hub also applies to selecting a dominant hub from among a plurality of hubs.

The functionality of a hub is described in more detail below. In some embodiments, a dominant hub has similar functionality as a hub, with this functionality being extended to the plurality of vehicular micro clouds within an overlapping vehicular micro cloud area and not being limited to a particular vehicular micro cloud.

Step 8: (Optional) The V2X messages broadcast at step 7 are received by the communication unit of the ego vehicle. The strategy system of the ego vehicle parses the V2X data from the V2X messages received by the communication unit of the ego vehicle and stores the V2X data in the memory of the ego vehicle. The strategy system of the ego vehicle parses the different component digital data from the V2X data (e.g., the remote sensor data, the member data, the intrinsic data, and the extrinsic data) and stores this digital data in the memory of the ego vehicle. In this way the strategy system of the ego vehicle receives several types of digital data from a set of remote vehicles and uses this digital data to provide its functionality. The strategy system of the ego vehicle therefore has access to a rich data set, including (1) the digital data it generates (e.g., the ego sensor data, the roadway data, the behavior data, the intrinsic data it determines, and the extrinsic data it determines) and (2) the digital data provided by the set of remote vehicles, to consider in the subsequent steps of this example general method.

Step 9: The strategy system of the ego vehicle analyzes the available V2X data to identify the presence of an overlapping vehicular micro cloud in a particular location or geographic area. For example, the member data received by the ego vehicle indicates the presence of a plurality of vehicular micro clouds being active in a same or similar geographic area of a roadway environment, and so, the strategy system of the ego vehicle determines that an overlapping vehicular micro cloud is present.

In some embodiments, the strategy system of the dominant hub is able to identify the location of the overlapping vehicular micro cloud area using the roadway data and/or the extrinsic data. For example, the roadway data describes roadway geometries and/or features that are prone to becoming overlapping vehicular micro cloud areas and the strategy system of the dominant hub is able to identify the location of the overlapping vehicular micro cloud area using, among other things, this information.

Step 10: The strategy system of the ego vehicle determines whether to implement a proactive strategy or a reactive strategy.

Proactive Strategy

A proactive strategy includes a preliminary arrangement in which the strategy system of the dominant hub prepares the strategy (e.g., the schedule of tasks for the plurality of vehicular micro clouds) beforehand (e.g., before any of the vehicular micro clouds actually reaches the overlapping vehicular micro cloud area). When the plurality of vehicular micro clouds meet with each other (e.g., arrive at the overlapping vehicular micro cloud area), the dominant hub executes operations to determine the member assignments and task swaps accordingly (e.g., the dominant hub determines the strategy data).

In some embodiments, the strategy system of the dominant hub determines to use a proactive strategy in scenarios involving traffic lights controlled by intersections whose size satisfies a threshold described by the threshold data (e.g., at least eight lanes of traffic converging at the intersection or some other metric described by the threshold data). In some embodiments, the strategy system is operable to consider variables such as signal phase of traffic lights and timing (which are described by the extrinsic data) when determining member assignments and task swaps included in the strategy (e.g., the schedule of tasks for the plurality of vehicular micro clouds).

In some embodiments, the strategy system of the dominant hub determines to use a proactive strategy in any scenario where a reactive strategy is not determined by the strategy system to be appropriate.

Reactive Strategy

A reactive strategy includes a strategy wherein the dominant hub of the plurality of vehicular micro clouds retrieves the member data when the plurality of vehicular micro clouds meet with each other at the overlapping vehicular micro cloud area and then determines the strategy data based on analysis of this digital data. For example, according to retrieved properties, the dominant hub determines the assignment of members to the various vehicular micro clouds and task swaps in real time.

In some embodiments, the strategy system of the dominant hub determines to use a proactive strategy in scenarios where vehicular micro clouds are determined by the strategy system of the dominant hub to be likely to stay within a predefined range of each other for certain period (e.g., vehicles queued in a cash lane of a toll gate).

In some embodiments, the strategy system of the dominant hub determines to use a reactive strategy in any scenario where a proactive strategy is not determined by the strategy system to be appropriate.

Step 11: The strategy system of the ego vehicle determines the strategy data for the current scenario. In some embodiments, the strategy is determined in accordance with a proactive strategy as described above. In some embodiments, the strategy is determined in accordance with a reactive strategy as described above.

Step 12: The strategy system of the ego vehicle determines member data for the various members of the plurality of vehicular micro clouds.

Step 13: The strategy system of the ego vehicle generates V2X data that includes, among other things, the member data determined in step 12.

Step 14: The strategy system of the ego vehicle builds V2X messages including the V2X data built at step 13.

Step 15: The strategy system of the ego vehicle transmits (e.g., broadcasts) the V2X messages built at step 14.

Step 16: The control systems of the members of the plurality of vehicular micro clouds receive the V2X messages transmitted at step 15.

Step 17: The strategy systems of the individual members parse the V2X data from the messages received at step 16.

Step 18: The strategy systems of the individual members take steps to timely execute the tasks assigned to them in the member data which is included in the V2X data parsed at step 17.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote connected vehicle depicted in FIG. 1 are connected vehicles.

A connected vehicle is a conveyance, such as an automobile, which includes a communication unit that enables the conveyance to send and receive wireless messages via one or more vehicular networks. The embodiments described herein are beneficial for both drivers of human-driven vehicles as well as the autonomous driving systems of autonomous vehicles. For example, the strategy system improves the performance of a vehicle control system, which benefits the performance of the vehicle itself by enabling it to operate more safety or in a manner that is more satisfactory to a human driver of the ego vehicle.

In some embodiments, the strategy system improves the performance of a network because it beneficially takes steps to enable the completion of vehicular micro cloud tasks.

In some embodiments, the strategy system improves the performance of a connected vehicle because it beneficially enables the onboard vehicle computer of a vehicle to provide uninterrupted vehicular cloud services while present in an overlapping vehicular micro cloud area.

In some embodiments, the strategy system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; a cloud server; and an edge server. The edge server may be an element of a roadside unit. For the purpose of clarity, the N remote vehicles may be referred to herein as the "remote connected vehicle" or the "remote vehicles" and this will be understood to describe N remote vehicles.

In some embodiments, the strategy system includes code and routines stored on and executed by a cloud server or an edge server.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

Nano Clouds

In some embodiments, the ego vehicle and some or all of the remote vehicles include their own instance of a strategy system. For example, in addition to the ego vehicle, some or all of the remote vehicles include an onboard unit having an instance of the strategy system installed therein.

In some embodiments, the ego vehicle and one or more of the remote vehicles are members of a vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud. An example of a vehicular micro cloud according to some embodiments includes the vehicular micro cloud 194 depicted in FIG. 1.

In some embodiments multiple instances of the strategy system are installed in a group of connected vehicles. In some embodiments, the group of connected vehicles are arranged as a vehicular micro cloud. As described in more detail below, the strategy system further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

Hub or Hub Vehicle

Vehicular micro clouds are managed by a hub or hub vehicle. In some embodiments, the strategy system that executes a method as described herein (e.g., the method 300 depicted in FIG. 3, the method 400 depicted in FIGS. 4A and 4B, the method 500 depicted in FIG. 5, or the example general method described herein, etc.) is an element of a hub or a hub vehicle. For example, the vehicular micro cloud formed by the strategy system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the operating environment 100 includes a roadside unit or some other roadway device, and this roadway device is the hub of the vehicular micro cloud.

In some embodiments, the strategy system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the strategy system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include Basic Safety Messages (BSMs) which include such sensor data in part 2 of their payload. In some embodiments, the technical data is included in the member data (and/or sensor data) depicted in FIG. 1 which vehicles such as the ego vehicle 123 and the remote vehicle 124 broadcast to one another via BSMs. In some embodiments, the member data also includes the sensor data of the vehicle that transmits the BSM as well as some or all of the other digital data described herein as being an element of the member data.

In some embodiments, the technical data is an element of the sensor data (e.g., the ego sensor data or the remote sensor data) which is included in the V2X data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the strategy system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the strategy system. For example, the strategy system is an element of a roadside unit that includes a communication unit 145 but not a server. In another example, the strategy system is an element of another vehicle such as one of the remote vehicles 124.

In some embodiments, the operating environment of the strategy system includes servers. Optionally, in these embodiments the strategy system includes code and routines that predict the expected latency of V2X communications involving serves and then time the transmission of these V2X communications so that the latency is minimized or reduced.

In some embodiments, the strategy system is operable to provide its functionality even though the vehicle which includes the strategy system does not have a Wi-Fi antenna as part of its communication unit. By comparison, some of the existing solutions require the use of a Wi-Fi antenna in order to provide their functionality. Because the strategy system does not require a Wi-Fi antenna in some embodiments, the strategy system is able to provide its functionality to more vehicles, including older vehicles without Wi-Fi antennas.

In some embodiments, the strategy system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the strategy system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud. In some embodiments, vehicles which the strategy system determines are ineligible to participate as members of the vehicular micro cloud are also excluded from providing rides to users as part of the Service.

In some embodiments, the strategy system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the strategy system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share their unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, in some but not all embodiments, any group of vehicles that includes a server or whose functionality incorporates a server is not a vehicular micro cloud as this term is used herein.

In some embodiments, a vehicular micro cloud formed by a strategy system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the strategy system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud (and/or a dominant hub of a plurality of vehicular micro clouds) is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 300 depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the strategy system, the server is an optional feature of the operating environment. An example of a preferred embodiment of the strategy system does not include the server in the operating environment which includes the strategy system.

In some embodiments, the strategy system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the strategy system requires vehicular micro cloud; this distinction alone differentiates the strategy system from the existing solutions. The strategy system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which task or sub-task they are performing among themselves while the tasks or sub-tasks are still being performed by the platoons in parallel. The existing solution also does not include functionality whereby platoons are re-organized based on monitored task executions results/performance and/or available vehicles and resources. As described herein, the strategy system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 1 and 2.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the strategy system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the strategy system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the strategy system includes software installed in an onboard unit of a connected vehicle. This software is the "strategy system" described herein.

An example operating environment for the embodiments described herein includes an ego vehicle, one or more remote vehicles, and a recipient vehicle. The ego vehicle the remote connected vehicle are connected vehicles having communication units that enable them to send and receive wireless messages via one or more vehicular networks. In some embodiments, the recipient vehicle is a connected vehicle. In some embodiments, the ego vehicle and the remote connected vehicle include an onboard unit having a strategy system stored therein.

Some of the embodiments described herein include a server. However, some of the embodiments described herein do not include a server. A serverless operating environment is an operating environment which includes at least one strategy system and does not include a server.

Figure 3:
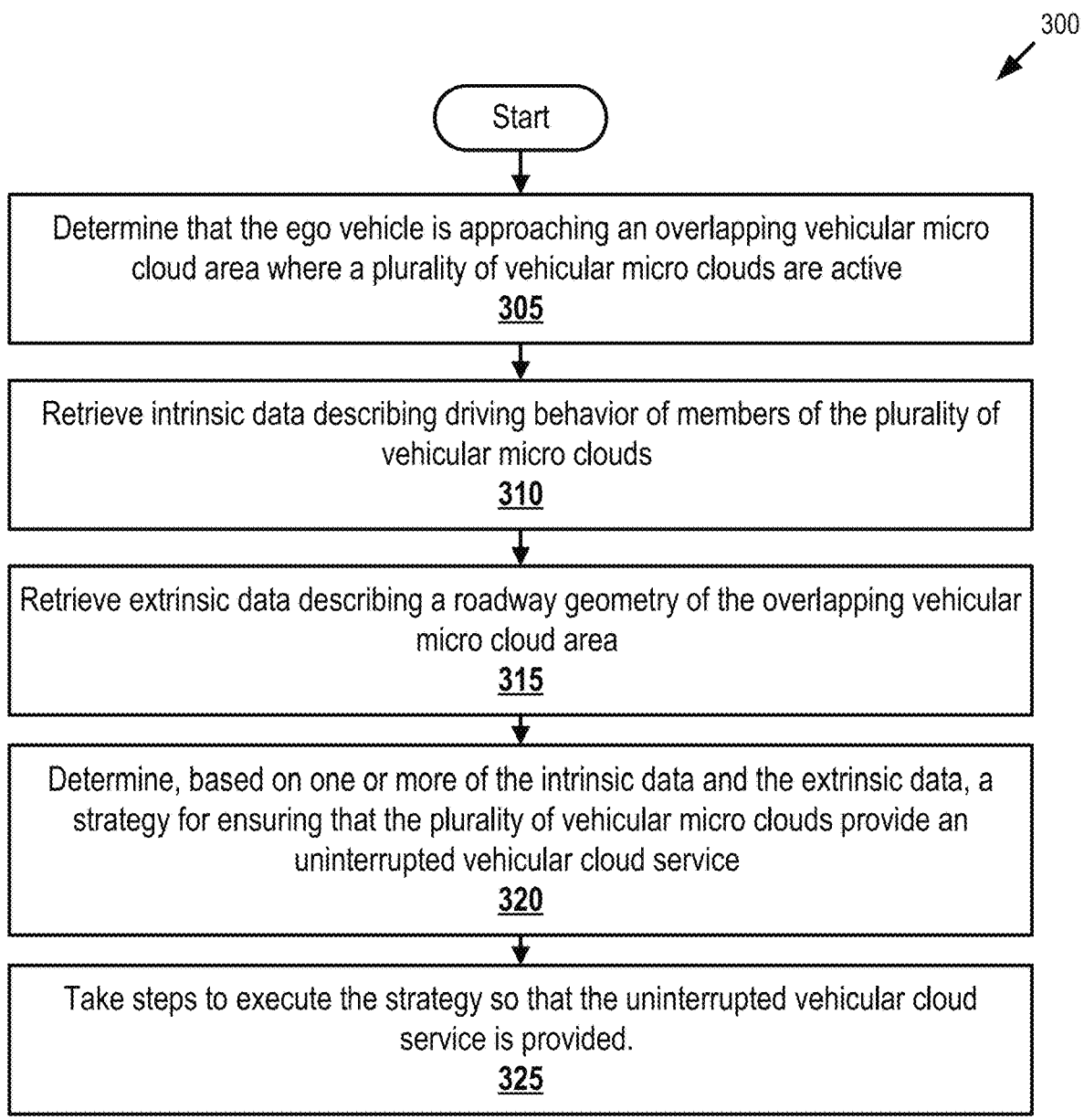
FIG. 3 is a flowchart of an example method for providing an uninterrupted vehicular cloud service according to some embodiments.

In some embodiments, the strategy system includes code and routines that are operable, when executed by a processor of the onboard unit, to cause the processor to execute one or more of the steps of the method 300 depicted in FIG. 3 or any other method described herein (e.g., the example general method).

This patent application is related to U.S. patent application Ser. No. 15/644,197 filed on Jul. 7, 2017 and entitled "Computation Service for Mobile Nodes in a Roadway Environment," the entirety of which is hereby incorporated by reference. This patent application is also related to U.S. patent application Ser. No. 16/457,612 filed on Jun. 28, 2019 and entitled "Context System for Providing Cyber Security for Connected Vehicles," the entirety of which is hereby incorporated by reference.

Example Overview

In some embodiments, the strategy system is software that is operable, when executed by a processor, to cause the processor to execute one or more of the methods described herein. An example operating environment 100 for the strategy system is depicted in FIG. 1.

In some embodiments, the strategy system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. For example, the communication unit 145 includes a C-V2X radio. FIG. 1 depicts an example operating environment 100 for the strategy system 199 according to some embodiments.

In some embodiments, the remote vehicle 124 is a connected vehicle, which is a vehicle such as the remote vehicle 124 or the ego vehicle 123 having V2X communication capability. In some embodiments, the remote vehicle 124 is not a connected vehicle. The ego vehicle 123 is a connected vehicle.

Example Operative Environment

Embodiments of the strategy system are now described. Referring now to FIG. 1, depicted is a block diagram illustrating an operating environment 100 for a strategy system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123") (which has a driver 109 in embodiments where the ego vehicle 123 is not at least a Level III autonomous vehicle); a remote vehicle 124 (which has a driver 108 in embodiments where the remote vehicle 124 is not at least a Level III autonomous vehicle); a cloud server 103; and an edge server 198. These elements are communicatively coupled to one another via a network 105. These elements of the operating environment 100 are depicted by way of illustration. In practice, the operating environment 100 may include one or more of the elements depicted in FIG. 1. For example, although only two vehicles 123, 124 are depicted in FIG. 1, in practice the operating environment 100 can include a plurality of these elements.

The operating environment 100 also includes the roadway environment 140. The roadway environment 140 was described above, and that description will not be repeated here.

In some embodiments, one or more of the ego vehicle 123, the remote vehicle 124, the edge server 198, and the network 105 are elements (e.g., members) of a vehicular micro cloud 194. The operating environment 100 includes a plurality of vehicular micro clouds 194 as depicted in FIG. 1. In some embodiments, the operating environment 100 also includes a plurality of remote vehicles 124. The ego vehicle 123 and the one or more remote vehicle 124 are member of one or more of the plurality of vehicular micro clouds 194; the memberships of the ego vehicle 123 and the one or more remote vehicles in the plurality of vehicular micro clouds 194 may or may not be similar.

In some embodiments, the ego vehicle 123 and the remote vehicle 124 include similar elements. For example, each of these elements of the operating environment 100 include their own processor 125, bus 121, memory 127, communication unit 145, processor 125, sensor set 126, onboard unit 139, standard-compliant GPS unit 150, and strategy system 199. These elements of the ego vehicle 123 and the remote vehicle 124 provide the same or similar functionality regardless of whether they are included in the ego vehicle 123 or the remote vehicle 124. Accordingly, the descriptions of these elements will not be repeated in this description for each of the ego vehicle 123 and the remote vehicle 124.

In the depicted embodiment, the ego vehicle 123 and the remote vehicle 124 store similar digital data. The system data 129 includes digital data that describes some or all of the digital data stored in the memory 127 or otherwise described herein. The system data 129 is depicted in FIG. 1 as being an element of the cloud server 103, but in practice the system data 129 is stored on one or more of the cloud server 103, the edge server 198, the ego vehicle 123, and one or more of the remote vehicles 124.

In some embodiments, the one or more of the vehicular micro clouds 194 are a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In some embodiments, one or more of the vehicular micro clouds 194 is a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963 filed on Oct. 31, 2017 and entitled "Identifying a Geographic Location for a Stationary Micro-Vehicular Cloud."

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

As described above, the operating environment 100 includes a plurality of vehicular micro clouds 194. For example, the operating environment 100 includes a first vehicular micro cloud and a second vehicular micro cloud. The operating environment 100 can include any positive whole number of vehicular micro clouds 194 that is greater than one.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, the edge server 198, etc.) which has completed a process to join the vehicular micro cloud 194 (e.g., a handshake process with the coordinator of the vehicular micro cloud 194). The cloud server 103 is excluded from membership in the vehicular micro cloud 194 in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

The member data 171 also describes the digital data described above with reference to a dominant hub and the example general method.

In some embodiments, the vehicular micro cloud 194 does not include a hardware server. Accordingly, in some embodiments the vehicular micro cloud 194 may be described as serverless.

In some embodiments, the vehicular micro cloud 194 includes a hardware server. For example, in some embodiments the vehicular micro cloud 194 includes the cloud server 103.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

In some embodiments, the network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 includes a car, a truck, a sports utility vehicle, a bus, a semi-truck, a drone, or any other roadway-based conveyance. In some embodiments, the ego vehicle 123 includes an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers. In some embodiments, the vehicle control system 153 is an autonomous driving system.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153; a communication unit 145; an onboard unit 139; a memory 127; and a strategy system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the strategy system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 includes a roadway that includes a roadway region. The ego sensor data 195 may describe measurable aspects of the physical environment. In some embodiments, the physical environment is the roadway environment 140.

As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the strategy system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the strategy system 199 provides its functionality as described herein with reference to the method 300 depicted in FIG. 3 and/or the example general method described herein.

In some embodiments, the sensor set 126 includes any sensors that are necessary to record ego sensor data 195 that describes the roadway environment 140 in sufficient detail to create a digital twin of the roadway environment 140. In some embodiments, the strategy system 199 generates the set of nano clouds and assigns sub-tasks to the nano clouds based on the outcomes observed by the strategy system 199 during the execution of a set of digital twins that simulate the real-life circumstances of the ego vehicle 123.

In some embodiments the strategy system 199 includes simulation software. The simulation software is any simulation software that is capable of simulating an execution of a vehicular micro cloud task. For example, the simulation software is operable simulate the strategy system 199 providing its functionality to generate some or all of the system data 129.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the strategy system 199. In some other embodiments, the simulation software is a standalone software that the strategy system 199 can access to execute digital twin simulations. In some embodiments, the strategy system 199 uses the digital twin simulations to determine one or more of the following: roadway data 135; behavior data 132; strategy data 182; intrinsic data 173; and extrinsic data 174.

Digital twin data 162 includes any digital data, software, and/or other information that is necessary to execute the digital twin simulations.

Digital twins, and an example process for generating and using digital twins which is implemented by the strategy system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The ego sensor data 195 includes digital data that describes any measurement that is taken by one or more of the sensors of the sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote vehicle 124, the ego vehicle 123, or some other tangible object or construct located in a roadway environment 140) is now described according to some embodiments. In some embodiments, the strategy system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the strategy system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the strategy system 199 to determine the lane of travel of the ego vehicle 123. This measurement improves the accuracy of the GPS data describing the location of lanes used by the ego vehicle 123 when the strategy system 199 is providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit 150 is a sensor included in the sensor set 126 and the GPS data is an example type of ego sensor data 195.

In some embodiments, the strategy system 199 causes an electronic display of the ego vehicle 123 to display a message describing information relating to the functionality provided by the strategy system 199. For example, the strategy system 199 causes an electronic display of the ego vehicle 123 to display a message describing one or more of the location of an overlapping vehicular micro cloud area 172 and the strategy selected by the strategy system 199 for managing the overlapping vehicular micro cloud area 172. The message is displayed as an element of a graphical user interface (GUI). GUI data 187 includes digital data that describes the GUI that includes the message. The strategy system 199 generates and outputs the GUI data 187.

In some embodiments, the GUI is displayed on an electronic display (not depicted) of the ego vehicle 123. In some embodiments, the strategy system 199 is communicatively coupled to the electronic display to provide the GUI data 187 to the electronic display and control the operation of the electronic display to display the GUI.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the strategy system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the strategy system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the threshold data 196; the member data 171; the digital twin data 162; the V2X data 133; the GPS data (as an element of the ego sensor data 195); the GUI data 187; the analysis data 181; the GUI data 187; the data structure 131; the roadway data 135; the behavior data 132; the strategy data 182; the remote sensor data 193; the time data 154; the ego sensor data 195; and the time data 155. The system data 129 includes some or all of this digital data. In some embodiments, the V2X messages (or C-V2X messages or the set of wireless messages) described herein are also stored in the memory 127. The above-described elements of the memory 127 were described above, and so, those descriptions will not be repeated here.

One or more of the roadway data 135, the behavior data 132, the strategy data 182 may or may not be elements of the data structure 131. For example, some or all of this digital data may be stored in the memory 127 but not in the data structure 131. The data structure 131 is an optional element.

In some embodiments, the ego vehicle 123 includes a vehicle control system 153. A vehicle control system 153 includes one or more ADAS systems or an autonomous driving system. In some embodiments, the strategy system 199 uses some or all of the payload of the set of wireless messages described herein as inputs to the vehicle control system 153 to improve the operation of the vehicle control system 153 by increasing the quantity of data it has access to when controlling the operation of the ego vehicle 123.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness strategy system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the strategy system 199 includes code and routines that are operable, when executed by the processor 125, to execute one or more steps of the example general method described herein. In some embodiments, the strategy system 199 includes code and routines that are operable, when executed by the processor 125, to execute one or more steps of the method 300 described below with reference to FIG. 3. In some embodiments, the strategy system 199 includes code and routines that are operable, when executed by the processor 125, to execute one or more steps of the method 400 described below with reference to FIGS. 4A and 4B. In some embodiments, the strategy system 199 includes code and routines that are operable, when executed by the processor 125, to execute one or more steps of the method 500 described below with reference to FIG. 5.

Figure 2:
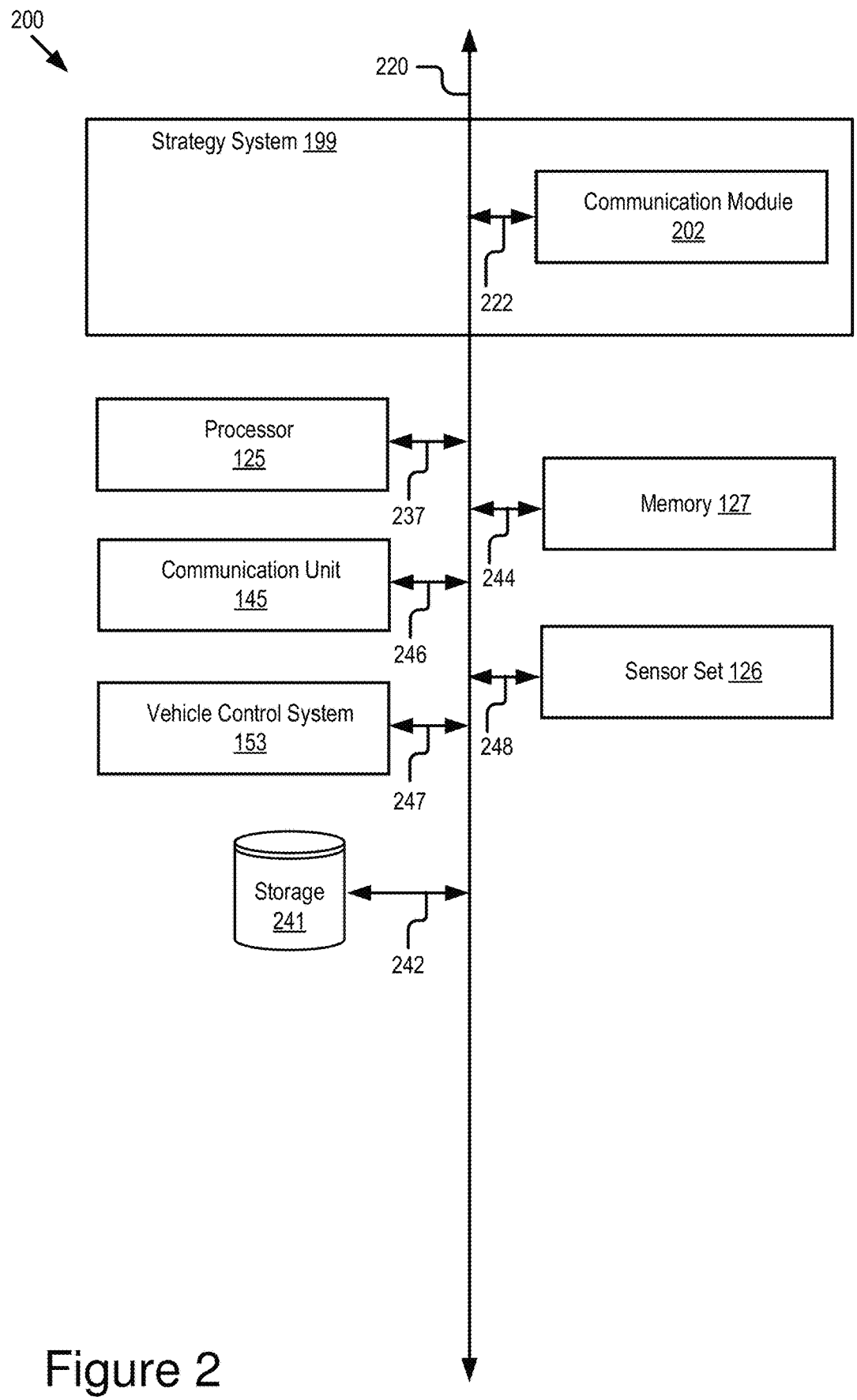
FIG. 2 is a block diagram illustrating an example computer system including a strategy system according to some embodiments.

An example embodiment of the strategy system 199 is depicted in FIG. 2. This embodiment is described in more detail below.

In some embodiments, the strategy system 199 is an element of the onboard unit 139 or some other onboard vehicle computer. In some embodiments, the strategy system 199 includes code and routines that are stored in the memory 127 and executed by the processor 125 or the onboard unit 139. In some embodiments, the strategy system 199 is an element of an onboard unit of the ego vehicle 123 which executes the strategy system 199 and controls the operation of the communication unit 145 of the ego vehicle 123 based at least in part on the output from executing the strategy system 199.

In some embodiments, the strategy system 199 is implemented using hardware including a field-programmable gate array ("FPGA") or an application-specific integrated circuit ("ASIC"). In some other embodiments, the strategy system 199 is implemented using a combination of hardware and software.

The remote vehicle 124 includes elements and functionality which are similar to those described above for the ego vehicle 123, and so, those descriptions will not be repeated here. In some embodiments, one or more of the ego vehicle 123 and the remote vehicle 124 are members of a vehicular micro cloud 194. In some embodiments, the ego vehicle 123 and the remote vehicle 124 are not members of a vehicular micro cloud 194.

The roadway environment 140 is now described according to some embodiments. In some embodiments, some, or all of the ego vehicle 123 and the remote vehicle 124 (or a plurality of remote vehicles) are located in a roadway environment 140. In some embodiments, the roadway environment 140 includes one or more vehicular micro clouds 194. The roadway environment 140 is a portion of the real-world that includes a roadway, the ego vehicle 123 and the remote vehicle 124. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 193. The remote sensor data 193 includes digital data that describes the sensor measurements recorded by the sensor set 126 of the remote vehicle 124.

In some embodiments, the real-world includes the real of human experience comprising physical objects and excludes artificial environments and "virtual" worlds such as computer simulations.

In some embodiments, the roadway environment 140 includes a roadside unit that in includes an edge server 198. In some embodiments, the edge server 198 is a connected processor-based computing device that includes an instance of the strategy system 199 and the other elements described above with reference to the ego vehicle 123 (e.g., a processor 125, a memory 127 storing the system data 129, a communication unit 145, etc.). In some embodiments, the roadway device is a member of the vehicular micro cloud 194.

The roadway environment includes an overlapping vehicular micro cloud area 172 for at least a period of time. The overlapping vehicular micro cloud area 172 is described above, and so, those descriptions will not be repeated here.

In some embodiments, the edge server 198 includes one or more of the following: a hardware server; a personal computer; a laptop; a device such as a roadside unit; or any other processor-based connected device that is not a member of the vehicular micro cloud 194 and includes an instance of the strategy system 199 and a non-transitory memory that stores some or all of the digital data that is stored by the memory 127 of the ego vehicle 123 or otherwise described herein. For example, the memory 127 stores the system data 129. The system data 129 includes some or all of the digital data depicted in FIG. 1 as being stored by the memory 127.

In some embodiments, the edge server 198 includes a backbone network. In some embodiments, the edge server 198 includes an instance of the strategy system 199. The functionality of the strategy system 199 is described above with reference to the ego vehicle 123, and so, that description will not be repeated here.

In some embodiments, the edge server 198 is operable to provide any other functionality described herein. For example, the edge server 198 is operable to execute some or all of the steps of the methods described herein.

In some embodiments, the edge server 198 includes an instance of the data structure 131. The data structure 131 includes a non-transitory memory that stores an organized set of digital data. For example, the data structure 131 includes many instances of roadway data 135. In some embodiments, the data structure 131 is indexed based on geographic location so that a vehicle can upload their GPS data as a query to the data structure 131 and receive a response that includes roadway data 135 that is tailored to the geographic area associated with the GPS data.

In some embodiments, the cloud server 103 one or more of the following: a hardware server; a personal computer; a laptop; a device such as a roadside unit; or any other processor-based connected device that is not a member of the vehicular micro cloud 194 and includes an instance of the strategy system 199 and a non-transitory memory that stores some or all of the digital data that is stored by the memory 127 of the ego vehicle 123 or otherwise described herein.

For example, the memory 127 stores the system data 129. In some embodiments, the cloud server 103 is operable to enable a strategy system 199 of the ego vehicle 123 to provide digital data to analyze feedback data (not depicted in FIG. 1) and determine modifications for the code and routines of the strategy system 199, which are then implemented as an update, so that the strategy system 199 generates improved strategies overtime. The feedback data includes digital data that describes the historical performance of the historical instances of strategy data 129. The strategy system 199 analyzes the feedback data and identifies where the performance of the historical instances of strategy data 129 where not optimal (e.g., relative to a threshold for performance) and determines modifications for the strategy data 129 that would have improved the performance of the historical instances of strategy data 129. The strategy system 199 then determines and implements modifications for its own code and routines so that the strategy system 199 determines improved strategy data 129 in the future based on the analysis of the feedback data.

In some embodiments, the cloud server 103 is operable to provide any other functionality described herein. For example, the cloud server 103 is operable to execute some or all of the steps of the methods described herein.

In some embodiments, the cloud server 103 includes an instance of the data structure 131. The data structure 131 includes a non-transitory memory that stores an organized set of digital data. For example, the data structure 131 includes many instances of roadway data 135. In some embodiments, the data structure 131 is indexed based on geographic location so that a vehicle can upload their GPS data as a query to the data structure 131 and receive a response that includes roadway data 135 that is tailored to the geographic area associated with the GPS data.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at various times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the strategy system 199 includes encryption keys for encrypting wireless messages and decrypting the wireless messages described herein.

Referring now to FIG. 2, depicted is a block diagram illustrating an example computer system 200 including a strategy system 199 according to some embodiments.

Figure 4A:
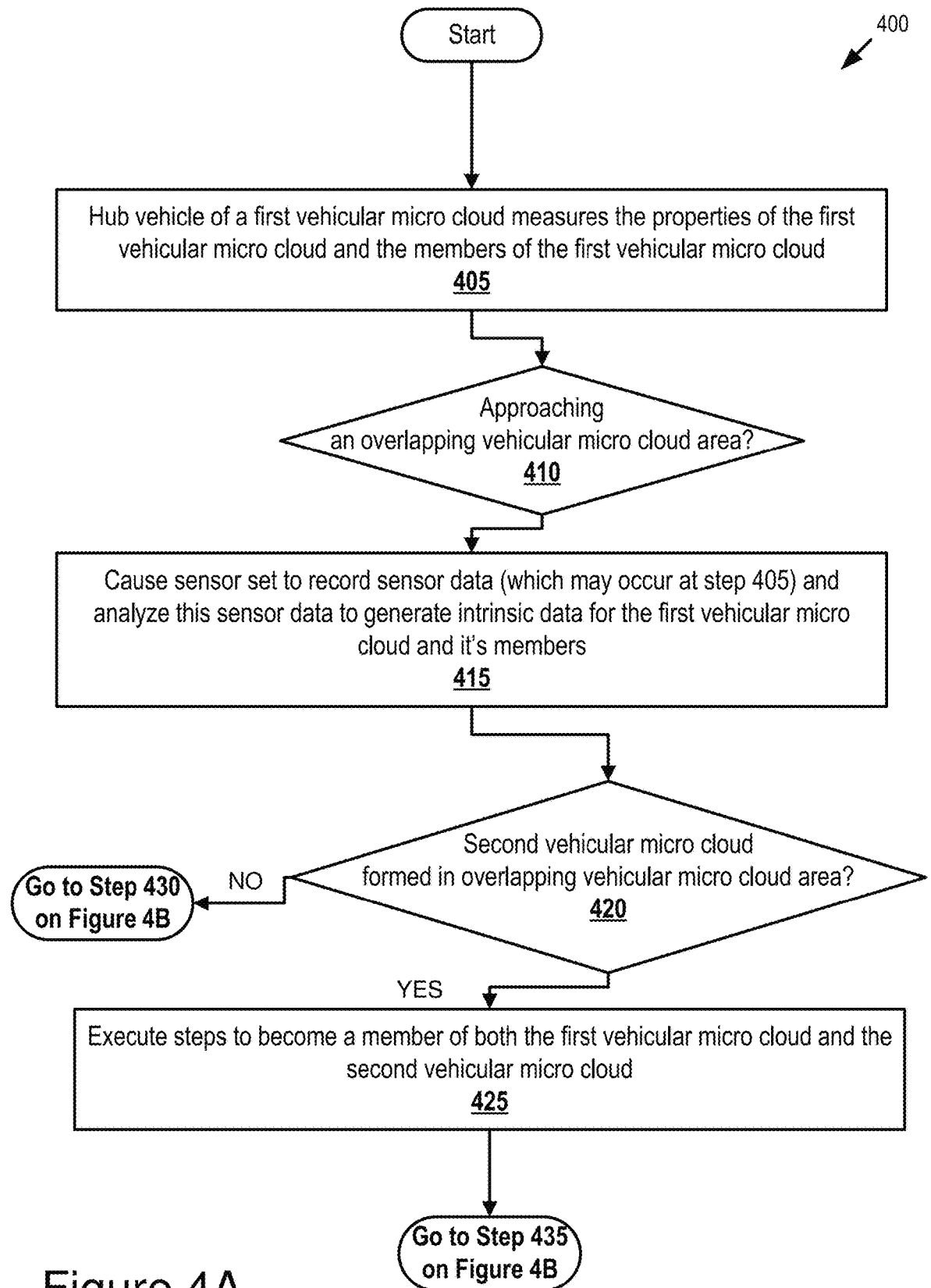
FIGS. 4A and 4B a flowchart of an example method for providing an uninterrupted vehicular cloud service according to some embodiments.
Figure 4B:
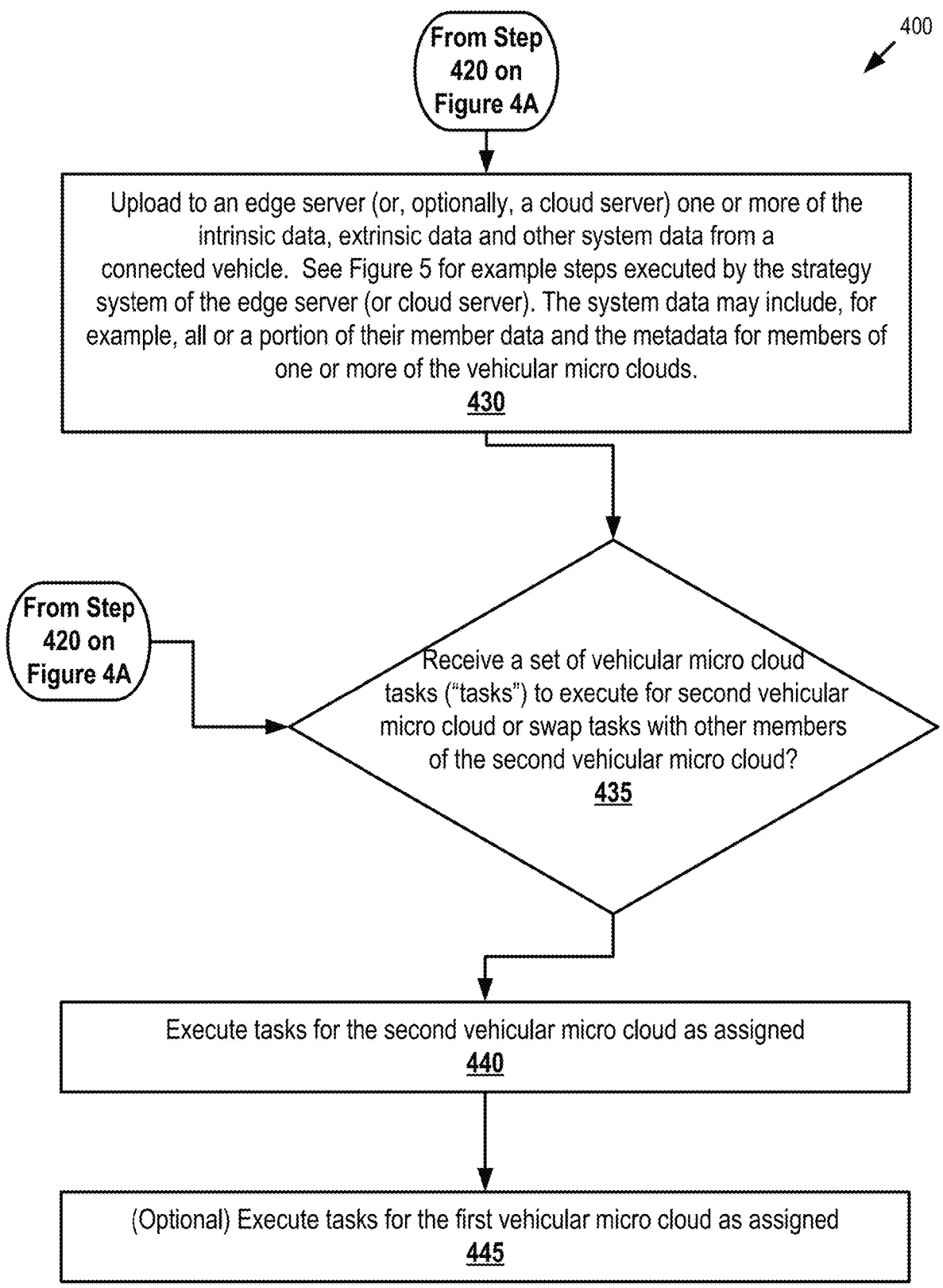
Figure 5:
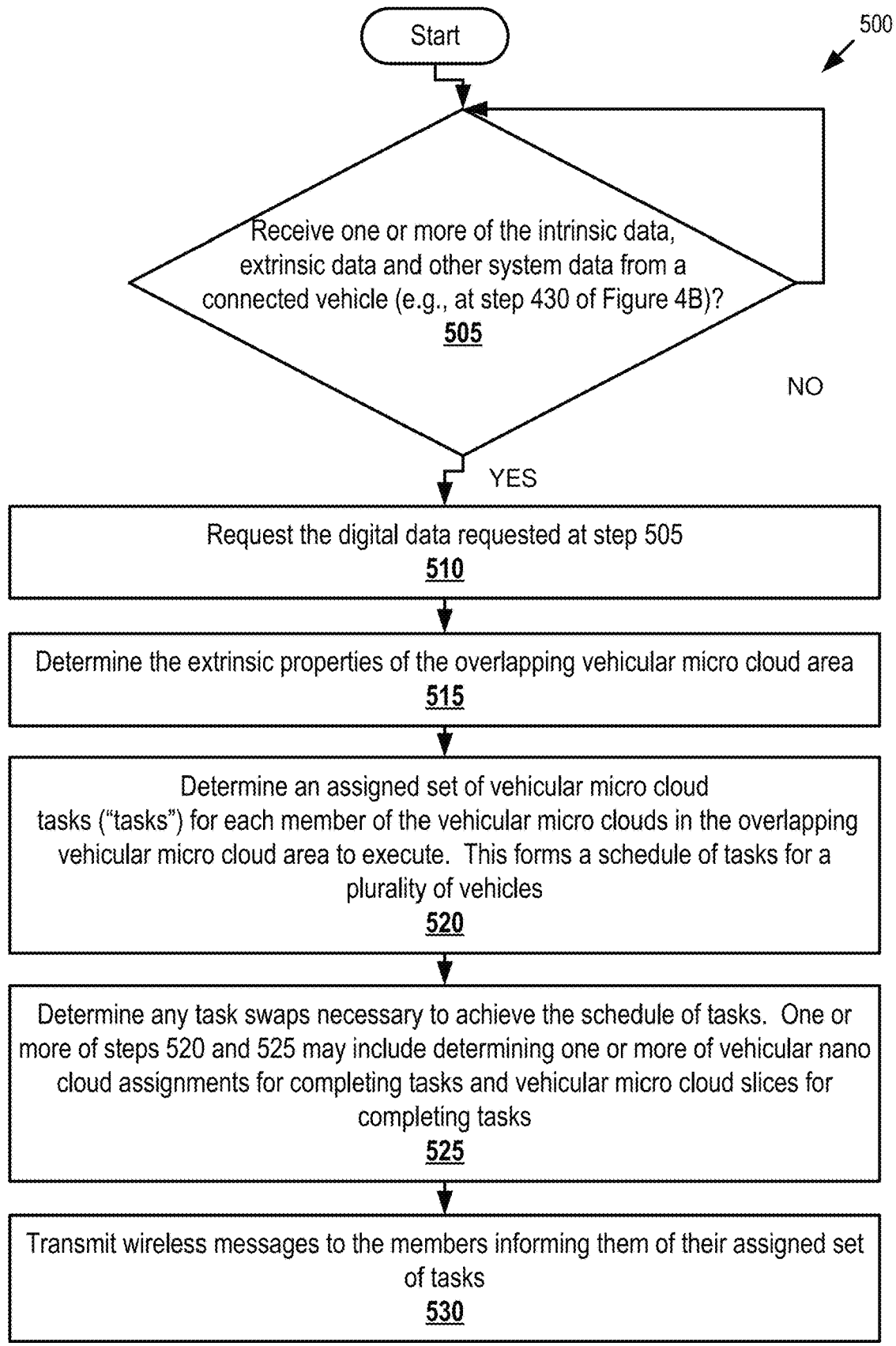
FIG. 5 is a flowchart of an example method for assigning a set of vehicular micro cloud tasks for members of a plurality of vehicular micro clouds to execute according to some embodiments.

In some embodiments, the computer system 200 may include a special-purpose computer system that is programmed to perform one or more of the following: one or more steps of one or more of the method 300 described herein with reference to FIG. 3; one or more steps of one or more of the method 400 described herein with reference to FIGS. 4A and 4B; one or more steps of one or more of the method 500 described herein with reference to FIG. 5; and the example general method described herein.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the strategy system 199; a processor 125; a communication unit 145; a vehicle control system 153; a storage 241; and a memory 127. The components of the computer system 200 are communicatively coupled by a bus 220.

In some embodiments, the computer system 200 includes additional elements such as those depicted in FIG. 1 as elements of the strategy system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the strategy system 199 includes code and routines that are operable, when executed by the processor 125, to cause the processor 125 to execute one or more steps of the method 300 described herein with reference to FIG. 3. In some embodiments, the strategy system 199 includes code and routines that are operable, when executed by the processor 125, to cause the processor 125 to execute one or more steps of the method 400 described herein with reference to FIGS. 4A and 4B. In some embodiments, the strategy system 199 includes code and routines that are operable, when executed by the processor 125, to cause the processor 125 to execute one or more steps of the example general method.

In the illustrated embodiment shown in FIG. 2, the strategy system 199 includes a communication module 202.

The communication module 202 can be software including routines for handling communications between the strategy system 199 and other components of the computer system 200. In some embodiments, the communication module 202 can be a set of instructions executable by the processor 125 to provide the functionality described below for handling communications between the strategy system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the strategy system 199 and stores the data in one or more of the storage 241 and the memory 127.

In some embodiments, the communication module 202 may handle communications between components of the strategy system 199 or the computer system 200.

Referring now to FIG. 3, depicted is a flowchart of an example method 300 according to some embodiments. The method 300 includes step 305, step 310, step 315, step 320, and step 325 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art.

Referring now to FIGS. 4A and 4B, depicted is a flowchart of an example method 400 according to some embodiments. The method 400 includes step 405, step 410, step 415, step 420, step 425, step 430, step 435, step 440, and step 445 as depicted in FIGS. 4A and 4B. The steps of the method 400 may be executed in any order, and not necessarily those depicted in FIGS. 4A and 4B. In some embodiments, one or more of the steps are skipped or modified in ways that are described herein or known or otherwise determinable by those having ordinary skill in the art.

Referring now to FIG. 5, depicted is a flowchart of an example method 300 according to some embodiments. The method 500 includes step 505, step 510, step 515, step 520, step 325, and step 530 as depicted in FIG. 5. The steps of the method 500 may be executed in any order, and not necessarily those depicted in FIG. 5. In some embodiments, one or more of the steps are skipped or modified in ways that are described herein or known or otherwise determinable by those having ordinary skill in the art.

Example differences in technical effect between the methods 300, 400, 500 and the prior art are described below. These examples are illustrative and not exhaustive of the possible differences.

The existing solutions do not utilize vehicular micro clouds to implement functionality such as that provided by the strategy system. The existing solutions also do not use digital twin simulations or other methods described herein to determine one or more of the following: roadway data; behavior data; strategy data; intrinsic data; and extrinsic data.

The existing references also do not describe vehicular micro clouds as described herein. Some of the existing solutions require the use of vehicle platooning. A platoon is not a vehicular micro cloud and does not provide the benefits of a vehicular micro cloud, and some embodiments of the strategy system that require a vehicular micro cloud. For example, among various differences between a platoon and a vehicular micro cloud, a platoon does not include a hub or a vehicle that provides the functionality of a hub vehicle. By comparison, in some embodiments the strategy system includes codes and routines that are operable, when executed by a processor, to cause the processor to utilize vehicular micro clouds to resolve version differences among common vehicle applications installed in different connected vehicles.

In some embodiments, the strategy system is operable to provide the following example functionality which is not present in the existing solutions to the problem of the vehicular micro clouds being unable to provide vehicular cloud services when in present in an overlapping vehicular micro cloud area.

The strategy system includes code and routines that are operable to analyze digital data (e.g., one or more of the sensor data, roadway data, and any other digital data described herein) to make one or more of the following determinations: (1) determine the trajectories of vehicular micro clouds from this analysis; and (2) determine the geographic regions or zones where the vehicular micro clouds meet with each other the most. These are examples of areas where overlapping vehicular micro cloud areas are prone to form. In this way, the strategy system is able to analyze the digital data to determine one or more of updated roadway data and extrinsic data according to some embodiments.

The strategy system includes code and routines that are operable to analyze digital data (e.g., one or more of the sensor data, roadway data, and any other digital data described herein) to determine intrinsic data (e.g., driving type or driving behavior profile) and extrinsic data (e.g., roadway geometry) for one or more of the following: (1) one or more vehicular micro clouds; and (2) one or more overlapping vehicular micro cloud areas The strategy system includes code and routines that are operable to analyze extrinsic data and intrinsic data to determine strategy data that describes plan for how to manage the task assignments within an overlapping vehicular micro cloud area so that all vehicular cloud services that are being performed by the vehicular micro clouds that are included in the vehicular micro cloud area are provided in an uninterrupted manner.

The strategy system includes code and routines that are operable to analyze extrinsic data and intrinsic data to track the performance of historical instances of strategy data so methods for determining future instances of strategy data are modified for improved performance relative to the performance of the historical instances of strategy data. In some embodiments, the memory 127 includes feedback data (not depicted herein). The feedback data includes digital data that describes the historical performance of the historical instances of strategy data. The strategy system analyzes the feedback data and identifies areas where the performance of the historical instances of strategy data where not optimal and determines modifications for the strategy data that would have improved the performance of the historical strategy data. The strategy system then determines and implements modifications for its own code and routines so that the strategy system implements improved strategy data in the future based on the analysis of the feedback data.

Depicted in FIGS. 6A and 6B is an example of an overlapping vehicular micro cloud area 172 managed by a strategy system according to some embodiments. The scenario depicted in FIG. 6A occurs at a first time $t_1$. The scenario depicted in FIG. 6B occurs at a second time $t_2$ where the second time $t_2$ occurs after the first time $t_1$.

The overlapping vehicular micro cloud area 172 includes four vehicular micro clouds: vehicular micro cloud A; vehicular micro cloud B; vehicular micro cloud C; and vehicular micro cloud D.

The overlapping vehicular micro cloud area 172 includes fourteen vehicles: vehicle 1; vehicle 2; vehicle 3; vehicle 4; vehicle 5; vehicle 6; vehicle 7; vehicle 8; vehicle 9; vehicle 10; vehicle 11; vehicle 12; vehicle 13; and vehicle 14. One or more of these vehicles includes their own instance of the strategy system.

In FIG. 6A, at the first time $t_1$, the vehicular micro cloud A includes vehicle 13, vehicle 14, vehicle 12, and vehicle 8. The vehicular micro cloud B includes vehicle 10, vehicle 11, vehicle 8, and vehicle 9. The vehicular micro cloud C includes vehicle 7, vehicle 5, vehicle 6, vehicle 4; vehicle 11; and vehicle 8. The vehicular micro cloud D includes vehicle 1, vehicle 3, vehicle 2, and vehicle 4.

At the first time $t_1$, the following vehicles are receiving the following vehicular cloud services:

the vehicular micro cloud A is providing a vehicle cloud service Q to vehicle 13;

the vehicular micro cloud B is providing a vehicle cloud service R to vehicle 9;

the vehicular micro cloud C is providing a vehicle cloud service S to vehicle 7; and the vehicle micro cloud D is providing a vehicular cloud service T to vehicle 4.

As used herein, the identifies Q, R, S, and T are variables that each represent any possible vehicular cloud service. They may be the same vehicular cloud service or different vehicular cloud services.

In the time interval between the first time $t_1$ and the second time $t_2$ the strategy system of a dominant hub determines a strategy (e.g., a schedule of tasks) for how to respond the occurrence of the vehicular micro cloud area. At the second time $t_2$, different vehicles are assigned to the different vehicular micro clouds at the second time $t_2$ and different vehicles are assigned different tasks, by the strategy system of the dominant hub, to execute in order to ensure the uninterrupted provision of the plurality of vehicular cloud services Q, R, S, and T for the benefit of vehicles 13, 9, 7, and 4, respectively. These task swaps occur responsive to the strategy determined by the strategy system of the dominant hub.

In FIG. 6B, at the second time $t_2$, the vehicular micro cloud A includes vehicle 2, vehicle 1, vehicle 13, and vehicle 6. The vehicular micro cloud B includes vehicle 8, vehicle 5, vehicle 9, and vehicle 14. The vehicular micro cloud C includes vehicle 7, vehicle 10, and vehicle 3. The vehicular micro cloud D includes vehicle 11, vehicle 12, and vehicle 4.

At the second time $t_2$, the following vehicles are receiving the following vehicular cloud services:

the vehicular micro cloud A is providing a vehicle cloud service Q to vehicle 13;

the vehicular micro cloud B is providing a vehicle cloud service R to vehicle 9;

the vehicular micro cloud C is providing a vehicle cloud service S to vehicle 7; and the vehicle micro cloud D is providing a vehicular cloud service T to vehicle 4.

The vehicular cloud services are provided in a timely fashion based on the execution of the assigned tasks by the respective members of the plurality of vehicular micro clouds. Accordingly, the plurality of vehicular cloud services Q, R, S, and T are provided without interruption for the benefit of vehicles 13, 9, 7, and 4, respectively, even though these vehicles are operating in an overlapping vehicular micro cloud area. This is an example benefit provided by the strategy system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A strategy system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the strategy system to become coupled to other strategy systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by an onboard vehicle computer of an ego vehicle, the method comprising:
   determining, based on receipt of a set of wireless messages, that the ego vehicle is approaching an overlapping vehicular micro cloud area where a plurality of vehicular micro clouds are providing a set of vehicular micro cloud services;
   retrieving intrinsic data describing driving behavior of members of the plurality of vehicular micro clouds;
   retrieving extrinsic data describing a roadway geometry of the overlapping vehicular micro cloud area;
   determining, based on one or more of the intrinsic data and the extrinsic data, a strategy for ensuring an uninterrupted provision of the set of vehicular micro cloud services; and
   taking steps to execute the strategy so that the uninterrupted provision continues.

2. The method of claim 1, wherein the ego vehicle is a hub vehicle of a vehicular micro cloud included in the plurality.

3. The method of claim 1, wherein the ego vehicle is not a hub vehicle of a vehicular micro cloud included in the plurality.

4. The method of claim 1, wherein the overlapping vehicular micro cloud area includes at least one geometry selected from a group including: an intersection; a roundabout; a traffic light; and a toll gate.

5. The method of claim 1, wherein the strategy is proactive and the steps of the strategy are implemented before reaching the overlapping vehicular micro cloud area.

6. The method of claim 1, wherein the strategy is reactive and the steps of the strategy are implemented after reaching the overlapping vehicular micro cloud area.

7. The method of claim 1, wherein the uninterrupted vehicular cloud service includes at least one vehicular cloud service that is continuously provided before reaching the overlapping vehicular micro cloud area and after reaching the overlapping vehicular micro cloud area.

8. A system of an ego vehicle comprising:
   a non-transitory memory;
   and a processor communicatively coupled to the non-transitory memory, wherein the non-transitory memory stores computer readable code that is operable, when executed by the processor, to cause the processor to execute steps including:
   determining, based on receipt of a set of wireless messages, that the ego vehicle is approaching an overlapping vehicular micro cloud area where a plurality of vehicular micro clouds are providing a set of vehicular micro cloud services;
   retrieving intrinsic data describing driving behavior of members of the plurality of vehicular micro clouds;
   retrieving extrinsic data describing a roadway geometry of the overlapping vehicular micro cloud area;

determining, based on one or more of the intrinsic data and the extrinsic data, a strategy for ensuring an uninterrupted provision of the set of vehicular micro cloud services; and taking steps to execute the strategy so that the uninterrupted vehicular cloud service is provided provision continues.

9. The system of claim 8, wherein the ego vehicle is a hub vehicle of a vehicular micro cloud included in the plurality.

10. The system of claim 8, wherein the ego vehicle is not a hub vehicle of a vehicular micro cloud included in the plurality.

11. The system of claim 8, wherein the overlapping vehicular micro cloud area includes at least one geometry selected from a group including: an intersection; a roundabout; a traffic light; and a toll gate.

12. The system of claim 8, wherein the strategy is proactive and the steps of the strategy are implemented before reaching the overlapping vehicular micro cloud area.

13. The system of claim 8, wherein the strategy is reactive and the steps of the strategy are implemented after reaching the overlapping vehicular micro cloud area.

14. The system of claim 8, wherein the uninterrupted vehicular cloud service includes at least one vehicular cloud service that is continuously provided before reaching the overlapping vehicular micro cloud area and after reaching the overlapping vehicular micro cloud area.

15. A computer program product including computer code stored on a non-transitory memory that is operable, when executed by an onboard vehicle computer of an ego vehicle, to cause the onboard vehicle computer to execute operations including:

determining, based on receipt of a set of wireless messages, that the ego vehicle is approaching an overlapping vehicular micro cloud area where a plurality of vehicular micro clouds are providing a set of vehicular micro cloud services;

retrieving intrinsic data describing driving behavior of members of the plurality of vehicular micro clouds;

retrieving extrinsic data describing a roadway geometry of the overlapping vehicular micro cloud area;

determining, based on one or more of the intrinsic data and the extrinsic data, a strategy for ensuring an uninterrupted provision of the set of vehicular micro cloud services; and taking steps to execute the strategy so that the uninterrupted provision continues.

16. The computer program product of claim 15, wherein the ego vehicle is a hub vehicle of a vehicular micro cloud included in the plurality.

17. The computer program product of claim 15, wherein the ego vehicle is not a hub vehicle of a vehicular micro cloud included in the plurality.

18. The computer program product of claim 15, wherein the overlapping vehicular micro cloud area includes at least one geometry selected from a group including: an intersection; a roundabout; a traffic light; and a toll gate.

19. The computer program product of claim 15, wherein the strategy is proactive and the steps of the strategy are implemented before reaching the overlapping vehicular micro cloud area.

20. The computer program product of claim 15, wherein the strategy is reactive and the steps of the strategy are implemented after reaching the overlapping vehicular micro cloud area.

* * * * *